United States Patent [19]
Sharp et al.

[11] Patent Number: 5,990,845
[45] Date of Patent: Nov. 23, 1999

[54] BROADBAND FAN CONE DIRECTION FINDING ANTENNA AND ARRAY

[75] Inventors: Eugene D. Sharp, Palo Alto; Sandy W. Hsi, Fremont, both of Calif.

[73] Assignee: TCI International, Sunnyvale, Calif.

[21] Appl. No.: 08/887,366

[22] Filed: Jul. 2, 1997

[51] Int. Cl.[6] .............................. H01Q 1/48; H01Q 1/00; H01Q 9/28; G01S 1/48
[52] U.S. Cl. ..................... 343/846; 343/787; 343/778; 343/854; 343/795; 343/830; 343/873
[58] Field of Search .................................... 343/773, 774, 343/890, 891, 807, 808, 787, 846

[56] References Cited

U.S. PATENT DOCUMENTS

| | | | |
|---|---|---|---|
| 3,983,561 | 9/1976 | Biagi et al. | 343/787 |
| 4,635,070 | 1/1987 | Hoover | 343/852 |
| 4,656,485 | 4/1987 | Werner et al. | 343/876 |
| 5,323,167 | 6/1994 | Peavey et al. | 342/429 |
| 5,412,390 | 5/1995 | Peavey et al. | 342/417 |
| 5,426,438 | 6/1995 | Peavey et al. | 342/433 |
| 5,506,592 | 4/1996 | MacDonald et al. | 343/846 |

OTHER PUBLICATIONS

Description of horn, biconical and triangular dipole antennas, Source unknown.
Zimbabwe contract documents.

*Primary Examiner*—Robert H. Kim
*Assistant Examiner*—Roy M. Runnoose
*Attorney, Agent, or Firm*—Ritter, Van Pelt and Yi LLP

[57] ABSTRACT

A broadband partial fan cone direction finding antenna and array disclosed. The antenna includes a radiator having a partial cone shape. The radiator substantially occupies a spatial area defined by a portion of a cone and the cone is defined by a cone axis, a cone height, and a cone angle. The cone has a base and an apex, and the portion of the cone is defined by a cone sweep angle. The cone sweep angle is determined as the angle subtended by a projection of the portion of the cone projected onto a plane that is perpendicular to the cone axis. The cone sweep angle is less than 360° so that the portion of the cone is bounded on its sides by edges which extend radially from the apex of the cone outward to the base of the cone.

29 Claims, 20 Drawing Sheets

ONE CONE (120 DEGS. 13 WIRES) OVER PERFECT GND
F=166.0 MHZ
ELEVATION PATTERN AT PHI=0 DEGS

ELEV. DBI PATTERNS AT .0 DEGS AZIMUTH ANG
FREQUENCY IS 166.000 MHZ. MAX. GAIN IS 4.60

ONE CONE (120 DEGS. 13 WIRES) OVER PERFECT GND
F=500.0 MHZ
ELEVATION PATTERN AT PHI=0 DEGS

ELEV. DBI PATTERNS AT .0 DEGS AZIMUTH ANG
FREQUENCY IS 500.000 MHZ. MAX. GAIN IS 6.31

ONE CONE (120 DEGS. 13 WIRES) OVER PERFECT GND
F=1000.0 MHZ
ELEVATION PATTERN AT PHI=0 DEGS

ELEV. DBI PATTERNS AT .0 DEGS AZIMUTH ANG
FREQUENCY IS 1000.000 MHZ. MAX. GAIN IS 10.45

ONE CONE (120 DEGS. 13 WIRES) OVER PERFECT GND
F=1500.0 MHZ
ELEVATION PATTERN AT PHI=0 DEGS

ELEV. DBI PATTERNS AT .0 DEGS AZIMUTH ANG
FREQUENCY IS 1500.000 MHZ. MAX. GAIN IS 9.87

ONE CONE (120 DEGS. 13 WIRES) OVER PERFECT GND
F=2000.0 MHZ
ELEVATION PATTERN AT PHI=0 DEGS

ELEV. DBI PATTERNS AT .0 DEGS AZIMUTH ANG
FREQUENCY IS 2000.000 MHZ. MAX. GAIN IS 10.49

ONE CONE (120 DEGS. 13 WIRES) OVER PERFECT GND
F=2700.0 MHZ
ELEVATION PATTERN AT PHI=0 DEGS

ELEV. DBI PATTERNS AT .0 DEGS AZIMUTH ANG
FREQUENCY IS 2700.000 MHZ. MAX. GAIN IS 11.44

ONE CONE (120 DEGS. 13 WIRES) OVER PERFECT GND
F=166.0 MHZ
AZIMUTH PATTERN AT TOA=0 DEGS

AZIMUTH DBI PATTERNS AT .0 DEGS ELEV. ANG
FREQUENCY IS 166.000 MHZ. MAX. GAIN IS 4.60

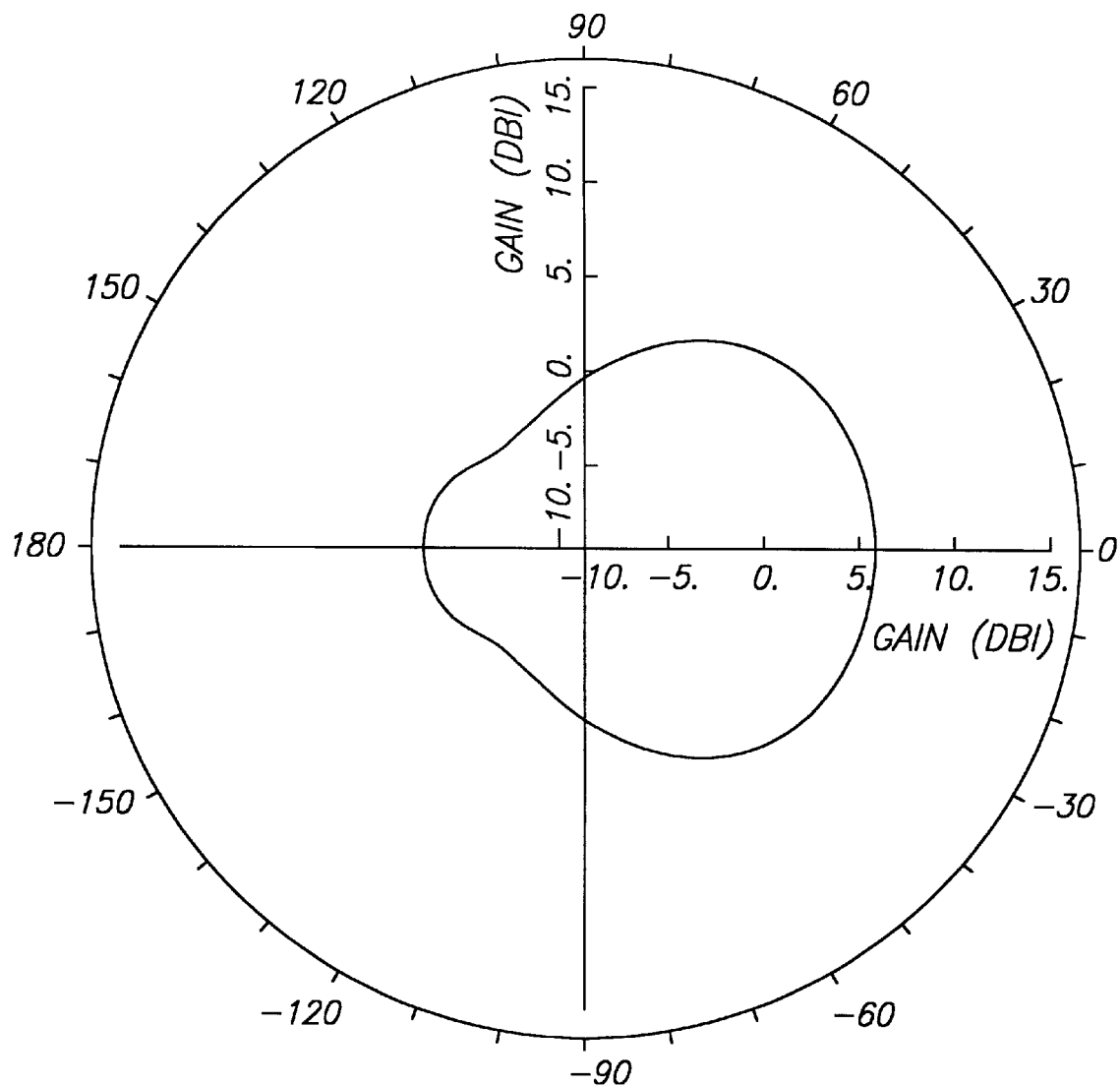
ONE CONE (120 DEGS. 13 WIRES) OVER PERFECT GND
F=500.0 MHZ
AZIMUTH PATTERN AT TOA=0 DEGS
AZIMUTH DBI PATTERNS AT .0 DEGS ELEV. ANG
FREQUENCY IS 500.000 MHZ. MAX. GAIN IS 6.31
FIH. 5H ONE CONE (120 DEGS. 13 WIRES) OVER PERFECT GND
F=1000.0 MHZ
AZIMUTH PATTERN AT TOA=0 DEGS AZIMUTH DBI PATTERNS AT .0 DEGS ELEV. ANG
FREQUENCY IS 1000.000 MHZ. MAX. GAIN IS 10.45

ONE CONE (120 DEGS. 13 WIRES) OVER PERFECT GND
F=1500.0 MHZ
AZIMUTH PATTERN AT TOA=0 DEGS

AZIMUTH DBI PATTERNS AT .0 DEGS ELEV. ANG
FREQUENCY IS 1500.000 MHZ. MAX. GAIN IS 10.81

ONE CONE (120 DEGS. 13 WIRES) OVER PERFECT GND
F=2000.0 MHZ
AZIMUTH PATTERN AT TOA=0 DEGS

AZIMUTH DBI PATTERNS AT .0 DEGS ELEV. ANG
FREQUENCY IS 2000.000 MHZ. MAX. GAIN IS 12.07

ONE CONE (120 DEGS. 13 WIRES) OVER PERFECT GND
F=2700.0 MHZ
AZIMUTH PATTERN AT TOA=0 DEGS

AZIMUTH DBI PATTERNS AT .0 DEGS ELEV. ANG
FREQUENCY IS 2700.000 MHZ. MAX. GAIN IS 11.94

BROADBAND FAN CONE DIRECTION FINDING ANTENNA AND ARRAY

BACKGROUND OF THE INVENTION

1. Field of the Invention

The present invention relates generally to antennas. More specifically, the present invention relates to a fan shaped conical antenna that is suitable for use in a direction finding array used in a direction finding system. Instead of using a full circular cone, the antenna includes only a sector of a complete circular cone. The antenna is used in a direction finding array of antennas that operates in the VHF/UHF/SHF bands.

2. Description of the Related Art

Conical antennas, which include a single inverted cone over a ground plane, and biconical antennas, which include a pair of cones oriented with their apexes pointing toward each other are used as broadband antennas for various applications, including direction finding. FIG. 1 is a schematic diagram illustrating two such antennas. A biconical antenna 100 includes a top inverted cone 101a and a bottom cone 101b. An electronic coupler 102 provides a connection to a feeding circuit (not shown) that provides an electrical signal that feeds the antenna. It should be noted that the antenna is symmetric about the cone axis and that each of the cones is a full cone, spanning 360°. Similarly, a single cone antenna 110 includes a single antenna cone 111 that also spans 360° and is symmetric about the cone axis. Single antenna cone 111 is connected to an electronic coupler 114 that provides a connection to a feeding circuit (not shown) that provides an electrical signal that feeds the antenna. The single cone antenna is located over a ground plane 112.

Antennas such as the ones shown above may be included in an array of antennas used for direction finding. Direction finding antenna arrays determine direction by comparing the phase or strength of signals received at different antennas. According to the principle of reciprocity, signals may likewise be sent from an array in a particular direction by altering the phase or strength of the electric signals feeding each of the antennas. Hereinafter, antenna surfaces such as top inverted cone 101a and bottom cone 101b are referred to as radiators and it should be understood that the antenna surfaces may be used to either radiate or receive a signal.

Because the conical antennas shown in FIG. 1 are symmetric about the cone axis, the radiation pattern from the antenna is omniazimuthal or isotropic with respect to the azimuth angle. As a result, the radiation patterns from such antennas tend to interfere with each other when a group of such antennas are included in an array. This complicates direction finding and may reduce the accuracy that may be achieved. Furthermore, each of the antennas take up a relatively large amount of space and must be spaced apart in an array to ensure that they do not physically interfere with each other.

What is needed is a direction finding antenna and a direction finding array made up of broadband antennas that do not radiate isotropically with respect to the azimuth angle and which occupy less physical space than the full conical antennas shown in FIG. 1.

SUMMARY OF THE INVENTION

Accordingly, the present invention provides a broadband antenna suitable for use in a direction finding array. In one embodiment, the antenna is designed for use over a 16:1 frequency bandwidth. The antenna uses only a sector of a circular cone and therefore occupies less space than a full cone. In a circular DF array, the antenna reduces the interactions between elements compared to typical omnidirectional elements. Asymmetries in the azimuthal antenna pattern of the antennas located along the perimeter of the array enables direction information to be determined from the amplitude of the signals detected by the antennas in the array. This provides more accurate and reliable direction finding.

It should be appreciated that the present invention can be implemented in numerous ways, including as a process, an apparatus, a system, a device, a method, or a computer readable medium. Several inventive embodiments of the present invention are described below.

In one embodiment, a broadband partial fan cone direction finding antenna and array disclosed. The antenna includes a radiator having a partial cone shape. The radiator substantially occupies a spatial area defined by a portion of a cone and the cone is defined by a cone axis, a cone height, and a cone angle. The cone has a base and an apex, and the portion of the cone is defined by a cone sweep angle. The cone sweep angle is determined as the angle subtended by a projection of the portion of the cone projected onto a plane that is perpendicular to the cone axis. The cone sweep angle is less than 360° so that the portion of the cone is bounded on its sides by edges which extend radially from the apex of the cone outward to the base of the cone.

In another embodiment, a flat fan antenna is disclosed that includes a flat metal radiator. The flat metal radiator is formed in the shape of a sector of a flat disc. The sector is defined by a sector angle, an inner radius and an outer radius. The sector angle determines the angle subtended by the sector; the inner radius determines the inner edge of the sector; and the outer radius determines the outer edge of the sector. The flat metal radiator is tilted from the vertical by a tilt angle. The flat fan antenna has a radiation pattern and performance similar to the pattern and performance of a partial fan cone antenna.

In another embodiment, An antenna direction finding array includes a plurality of direction finding antennas approximately spaced around the circumference of a circle. Each direction finding antenna is pointed outward from the center of the circle, and each of the direction finding antennas has an amplitude response that is greater in the azimuthal direction that the antenna is pointed. A central reference antenna has an amplitude response that is substantially omniazimuthal so that the central reference antenna is suitable to be connected to a reference receiver and a signal from the central reference antenna is suitable for use as a reference for measuring the phase of the signals from the plurality of direction finding antennas.

These and other features and advantages of the present invention will be presented in more detail in the following specification of the invention and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 5h shows the azimuth pattern at 500 MHz.

DETAILED DESCRIPTION OF THE PREFERRED EMBODIMENTS

Reference will now be made in detail to the preferred embodiment of the invention. An example of the preferred embodiment is illustrated in the accompanying drawings. While the invention will be described in conjunction with that preferred embodiment, it will be understood that it is not intended to limit the invention to one preferred embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
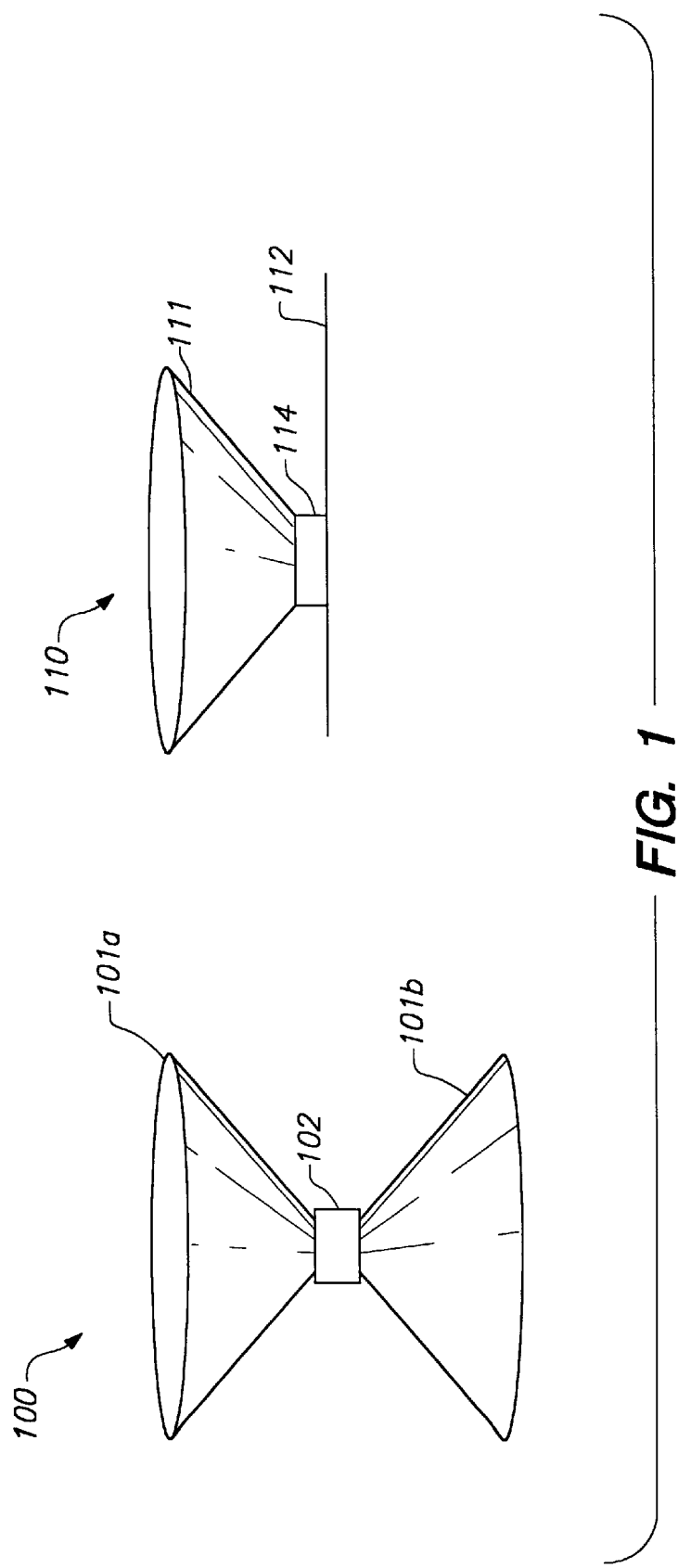
FIG. 1 is a schematic diagram illustrating two such antennas.
Figure 2:
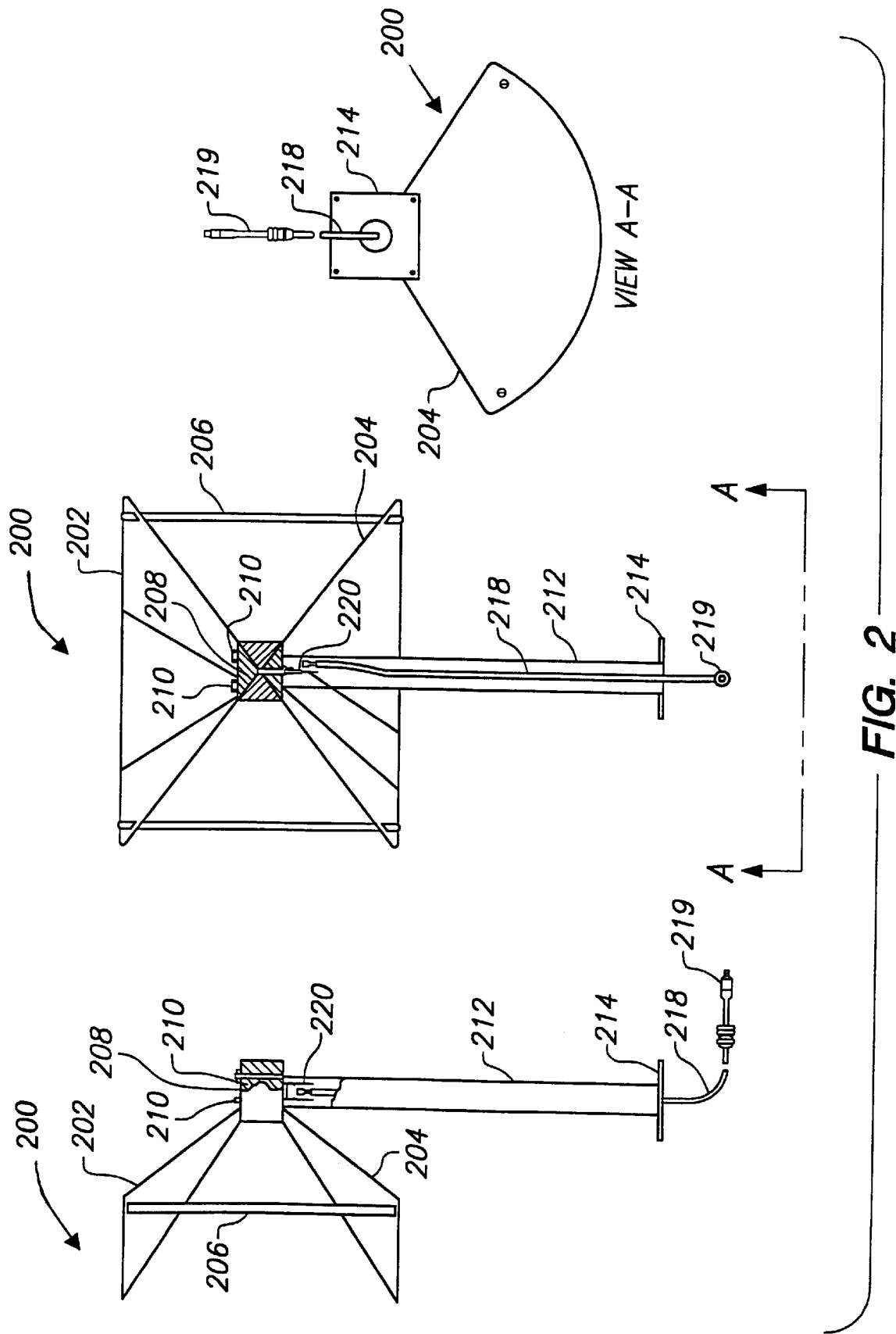
FIG. 2 is a schematic diagram of a biconical antenna constructed according to one embodiment of the present invention.

FIG. 2 is a schematic diagram of a biconical antenna 200 constructed according to one embodiment of the present invention. A top fan 202 is constructed of a metal sheet that is formed in the shape of a partial cone. Instead of sweeping 360 the fan sweeps out only 120°. Therefore the fan is in the shape of ⅓ of a complete cone. It is preferred that the fan sweep out between 80° and 180°. More preferably, the fan sweeps out between 105° and 135° and most preferably the fan sweeps out 120° plus or minus a few degrees. A bottom fan 204 sweeps out substantially the same angle as top fan 202. The size of the fans may be scaled according to the wavelength of radiation that is being transmitted or received. When scaling an antenna, all the antenna dimensions are scaled proportionally to wavelength; i.e. if the wavelength is doubled, all the antenna dimensions are doubled. In some embodiments, a dielectric spacer 206 is provided to mechanically stabilize the fans. This is especially important when the antenna is mounted in a windy environment. In other embodiments, reinforced metal veins are provided along the inner surface or outer surface of the partial cone to provide structural strength. So long as the veins have a relatively low profile to the cone surface, the electrical performance is not significantly degraded.

In addition, in some embodiments, the two axes of the upper and lower cones need not be vertical or parallel as shown. The axes are shown parallel in FIG. 2 with the apex of the lower cone pointing straight up and the apex of the lower cone pointing straight down. Both axes could be tilted the same amount or by different amounts from the vertical. In one embodiment, the axes are tilted toward each other along the center line of the fan cone by up to 45° so that the fan cone surfaces are closer together than if the axes were not tilted.

An insulating spacer 208 is provided between the upper and lower fans. The fans are attached to the insulating spacer using a set of dielectric screws 210. In a preferred embodiment, the screws and the insulating spacer are made of nylon. Insulating spacer 208 is physically attached to a metal support pipe 212 that is supported by a metal base 214. A coaxial cable 218 runs through metal support pipe 212. It should be noted that the cone shaped fans do not extend all the way to the apex of the cone but are truncated before the apex in some embodiments. Coaxial cable 218 is connected at one end to a connector 219 that is suitable for connecting to a transmitter that generates an electrical signal or to a receiver that processes a signal received by the antenna. The support pipe may be dielectric and ferrite beads may be placed around the coaxial cable in order to choke off currents. In one embodiment, the connector is a standard 50Ω connector and the cable is a 50Ω cable. Other impedences are used in other embodiments. At the other end, coaxial cable 218 is electrically coupled to the two antenna fans via a circuit board 220 that provides a lightning protection circuit to protect the transmitter or receiver from surges caused by lightning striking the antenna.

Preferably, the cone shaped fan extends almost completely to a point at the apex of the cone and is truncated by a very small amount. In one embodiment, the width of the inner edge of the fan cone near the apex is about 0.25 inch or about 0.5 cm. When the size of the inner edge of the fan cone is very small, electrical discontinuities are avoided when the signal is fed to the antenna. This keeps the impedance constant over a larger frequency range and keeps the VSWR relatively low. In one embodiment, a small hole is drilled near the inner edge of the fan cone and the center conductor of coaxial cable 218 is extended through the hole and soldered to the fan cone. In some embodiments, a washer is used to reinforce the hole and help hold the wire in place. Similarly, in the flat fan antenna embodiment described below, it is preferable to extend the inner edge of the flat fan to as close to a point as possible to minimize discontinuities.

In one embodiment, the length along a radial of the fan cone surface is about 0.20 wavelengths at the lowest frequency of operation. The length in one preferred embodiment is approximately 12 inches. The interior angle between the two fan cone surfaces is preferably between 50° and 80°. Thus, when the two cone axes are vertical and the two cones have the same cone angle so the cone angles will be between 50 and 65 degrees. In some embodiments, the cone angles used may be as small as 20° and as large as 80° and in some embodiments the upper and lower cone angles may differ. Most preferably, the interior angle between the fan cone surfaces is about 60°.

The curved surfaces of the partial cone shaped fans which function as the radiators for the biconical antenna help provide a substantially constant input impedance for the antenna across a large frequency bandwidth. In another embodiment, the fans are made of a flat metal sheet formed into a pie shaped portion of a flat disc. Instead of defining a sector of a cone, a flat fan is shaped to define a portion or sector of a circle. The angle that defines the size of the sector, referred to as the sector angle, roughly corresponds to the sweep angle of the fan cone antenna. Typically, the flat fan is tilted from the vertical at a tilt angle that roughly corresponds to the cone angle used for a fan cone. Like the fan cone antenna, the flat fan antenna may be implemented as a double fan or as a single fan over a ground plane. When implemented as a double flat fan, the tilt angles of the two fans determine an interior opening angle that is the angle defined by the two surfaces.

As shown below, the VSWR for flat fans is similar to the VSWR for curved fans over a broad frequency range. A flat embodiment is very useful since manufacturing flat cone fan sectors is considerably easier than manufacturing curved fans that define a portion of a conical surface. The sector angle used for the flat fan antennas preferably sweeps out between 60° and 180°. More preferably, the fan sweeps out between 70° and 130° and most preferably the fan sweeps out 80° plus or minus a few degrees. The interior opening angle between the fans is between about 20° and 140°. More preferably, the interior opening angle is between about 40° and 80°. Most preferably, the interior opening angle is about 60° plus or minus a few degrees.

Figure 3A:
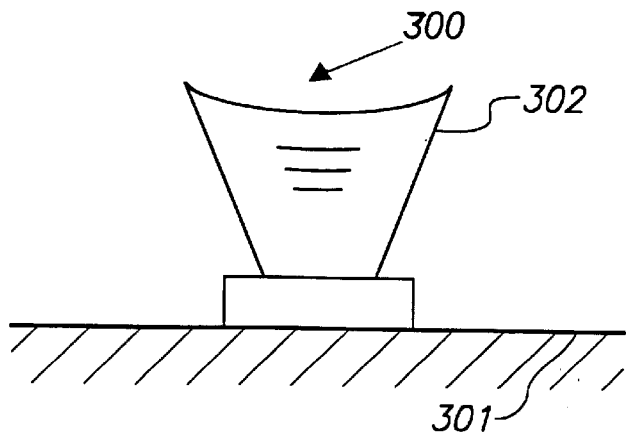
FIG. 3a is a schematic diagram of single fan conical antenna that is used in certain embodiments over a ground plane.

FIG. 3a is a schematic diagram of single fan conical antenna 300 that is used in certain embodiments over a ground plane 301. Similar to a biconical antenna, a partial cone radiator 302 is a curved surface that includes only about 120° of a 360° full cone. The impedance characteristics of the single fan conical antennas are similar to the impedance characteristics of the biconical fan antenna. It is preferred that the fan sweep out between 80° and 180°. More preferably, the fan sweeps out between 105° and 135° and most preferably the fan sweeps out 120° plus or minus a few degrees.

Figure 3B:
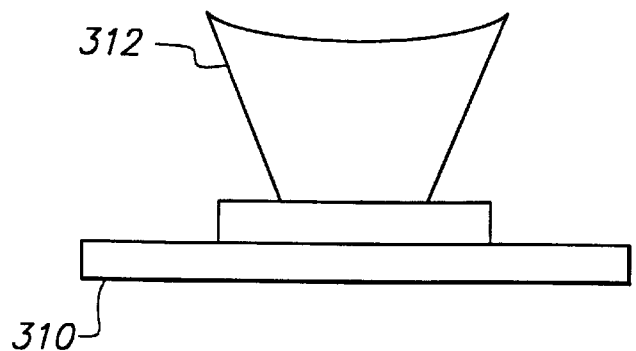
FIG. 3b is a schematic diagram illustrating single fan conical antenna that includes a metal disc at approximately the apex of an inverted cone that is perpendicular to the cone axis.

FIG. 3b is a schematic diagram illustrating single fan conical antenna that includes a metal disc 310 at approximately the apex of an inverted cone 312 that is perpendicular to the cone axis. The metal disc is used in applications where a ground plane is not present. In other embodiments, the metal disc is not parallel to the cone axis. The impedance is not as constant as the biconical antenna, but the performance is satisfactory for applications that do not require constant impedance over the broadest possible bandwidth.

Figure 3C:
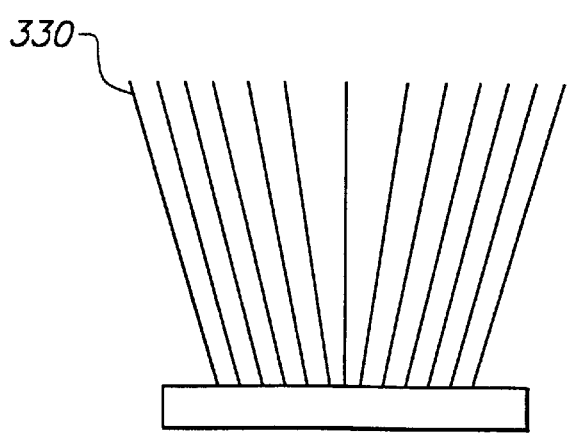
FIG. 3c is a schematic diagram illustrating single fan conical antenna that is made up of a series of rods that are used in place of a curved metal sheet.

FIG. 3c is a schematic diagram illustrating single fan conical antenna that is made up of a series of rods 330 that are used in place of a curved metal sheet. The rods are angled such that they occupy a conical path subtending approximately 120°, similar to the biconical fan and the single fan antennas described above. The rods are generally less susceptible to deformation or damage as a result of wind than the metal sheets. In the antenna shown, 13 metal rods are used to define a 120° sweep. It is preferred that the fan sweep out between 80° and 180°. More preferably, the fan sweeps out between 105° and 135° and most preferably the fan sweeps out 120° plus or minus a few degrees. The number of rods used is preferably between 10 and 30 and more preferably between 10 and 20. In some embodiments, an even greater number of rods is used. Performance of such an antenna compared to an antenna with a cone portion made of a curved metal sheet is not significantly different. It should also be noted that a biconical antenna may also be similarly constructed with fans that include rods instead of metal sheets in accordance with the present invention.

Figure 3D:
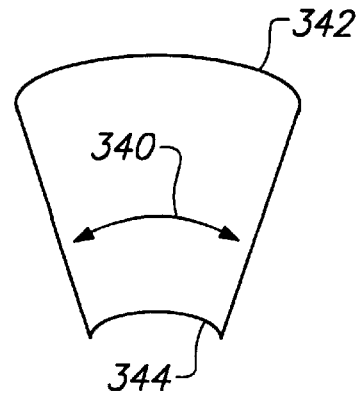
FIG. 3d is a schematic diagram of a top view of a flat fan conical antenna surface. The antenna surface is flat and pie shaped.

FIG. 3d is a schematic diagram of a top view of a flat fan conical antenna surface. The antenna surface is flat and pie shaped. The surface is characterized by a sector angle 340 and by an inner edge radius 344 and an outer edge radius 342 that determine the size of the surface. As noted above, the size of the inner edge is preferably very small so that electrical discontinuities are minimized. Preferably the inner edge radius is made small so that the inner edge is almost a point. In one embodiment, the inner edge radius is less than an inch. It should be noted that in some embodiments, the inner and outer arcs may be squared off into straight edges. The length along a radial for the flat fan is scaled according to the wavelength being sent or received. In one embodiment, the length is about 12 inches long.

Figure 4A:
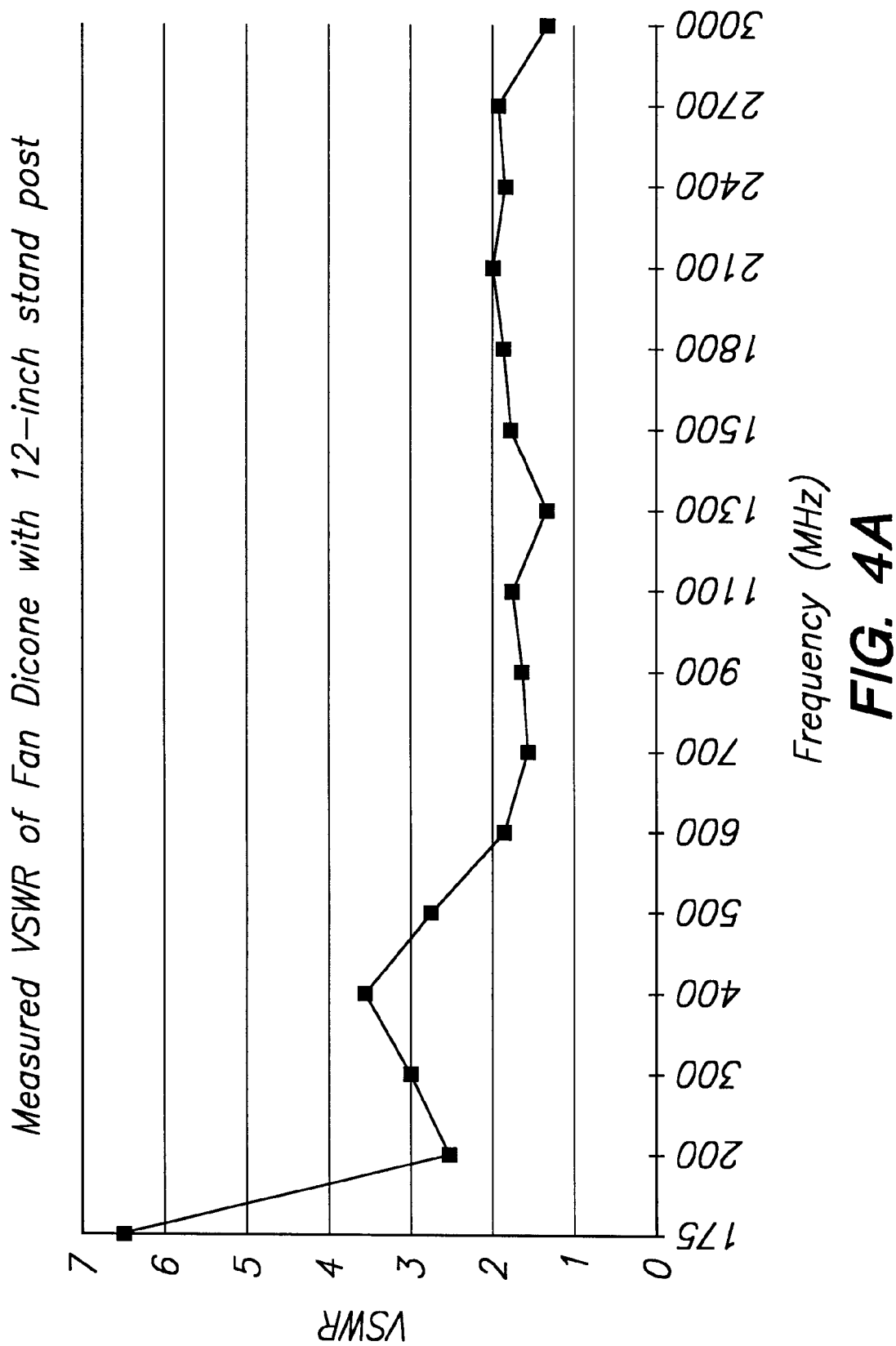
FIG. 4a is a graph showing the measured VSWR for a typical biconical fan antenna such as the one shown in FIG. 2 for a 50Ω antenna feed.

FIG. 4a is a graph showing the measured VSWR for a typical biconical fan antenna such as the one shown in FIG. 2 for a 50Ω antenna feed. The VSWR is a measure of how much energy is reflected back toward the transmitter when a signal is applied to the antenna with a given input impedance. It can be seen from the graph that the VSWR is close to 2:1 across a large bandwidth from about 180 MHz to 3000 Mhz for about a 16:1 range in bandwidth. This is because the impedance of the antenna is nearly constant across the band, between approximately 80 and 100Ω. Thus, the antenna can be used with a simple 50Ω feed with no need for an active amplifier over a large bandwidth. In some embodiments, an active amplifier is used to further extend the bandwidth.

Figure 4B:
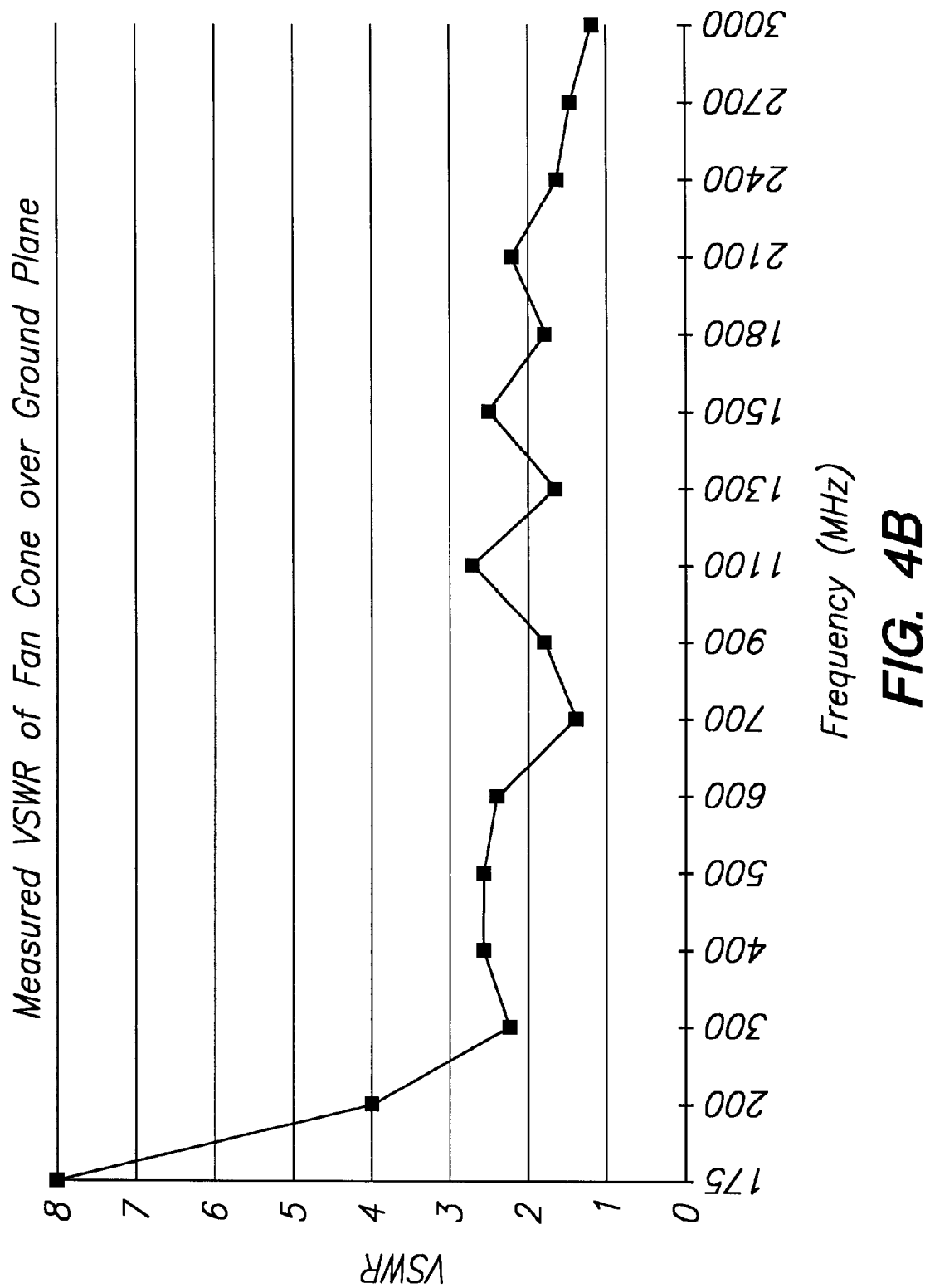
FIG. 4b is a graph showing the measured VSWR for a typical singe cone fan antenna over a ground plane.
Figure 4C:
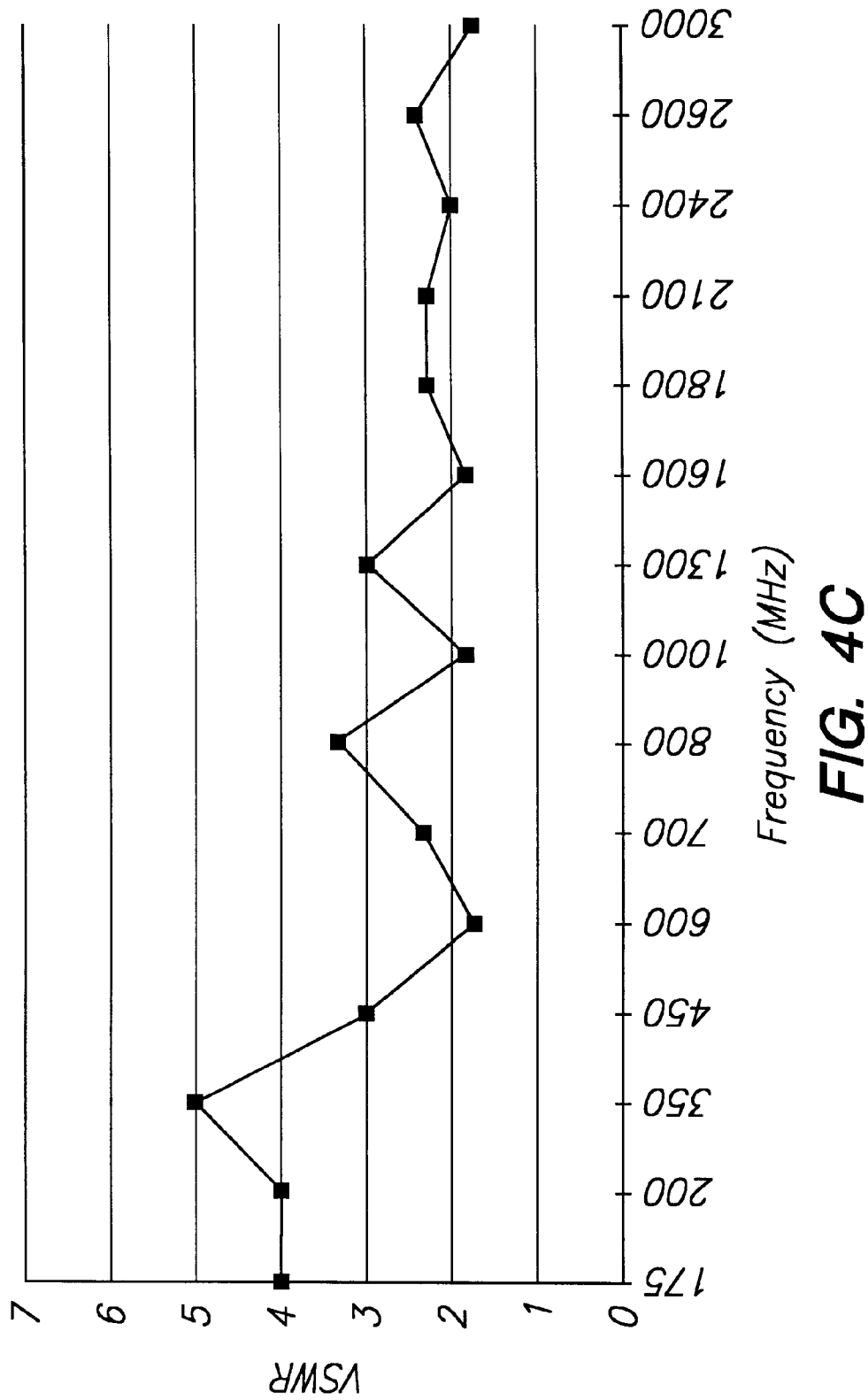
FIG. 4c is a graph showing the measured VSWR for a typical double flat fan antenna for a 50Ω feed.

Similarly, FIG. 4b is a graph showing the measured VSWR for a typical singe cone fan antenna over a ground plane. The VSWR is similar to that shown in FIG. 4a. FIG. 4c is a graph showing the measured VSWR for a typical double flat fan antenna for a 50Ω antenna feed. The particular double flat fan antenna measured had two flat fans 12 inches long with 80° fan sectors. The top fan was tilted downward away from vertical by about 59.5° and the bottom fan was tilted upward from the vertical by the same amount so that the two fans together defined an interior angle of about 61°. As can be see, the VSWR remains close to 2 over a large bandwidth and is less than 5 from 175 MHz to 3000 MHz. The impedance of the antenna is nearly constant across the band, between approximately 80 and 100Ω.

For the above described antennas, the angle of the cone fan surface relative to the vertical cone axis, referred to as the cone angle, or the angle of the flat fan surface relative to vertical, referred to as the tilt angle, determines the impedance of the antenna. (Note that the cone angle should be distinguished from the sweep angle which determines the portion of a cone included in the fan, e.g. 360° for a full cone and 120° in the ⅓ fan cone examples above. Likewise, the tilt angle should be distinguished from the sector angle which determines the portion of a disc included in the fan, e.g. 360° for a full disc and less than 360° for a sector of a disc.) The above data was taken for cone angles and tilt angles of about 60°, leaving an interior opening between the surfaces of about 60° which is most preferred. In the case of a single fan antenna, the angle between the fan surface and a ground plane is preferably about 30°.

As noted above, Cone angles between 20° and 80° and tilt angles between 20° and 80° may also be used. For a biconical antenna, as the cone angle is increased and the cones are moved closer together, the impedance decreases and the antenna may radiate less at low frequencies. Likewise, as the cone angle is increased for a single cone the impedance is also decreased. Generally, the separation between the cone surfaces or between a single cone surface and a virtual reflected surface below the ground plane must be at least about one half a wavelength at the outer edge of the surfaces in order for the antenna to radiate efficiently.

Figure 5A:
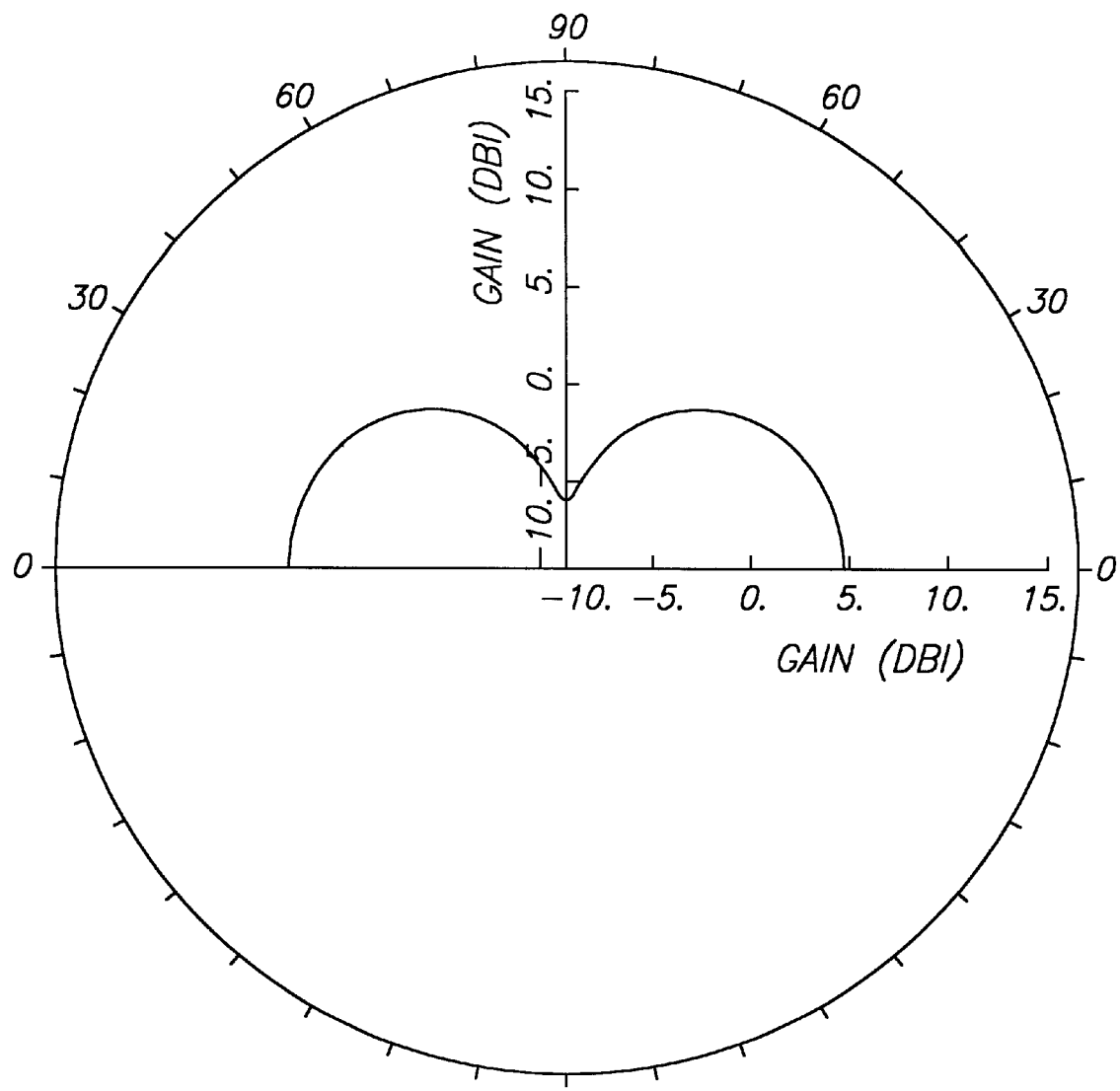
FIG. 5a shows the elevation pattern at 166 MHz.
Figure 5B:
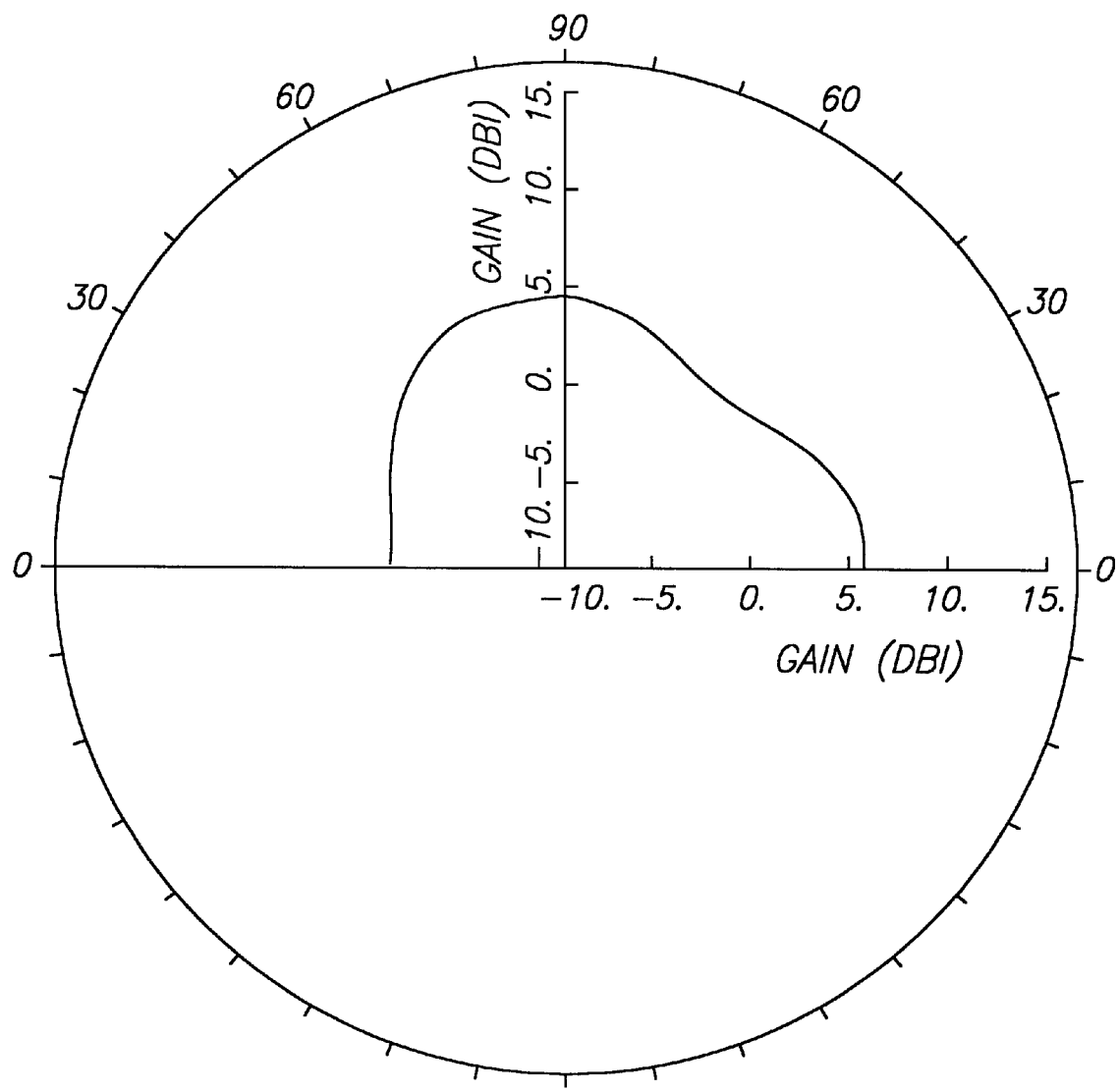
FIG. 5b shows the elevation pattern at 500 MHz.
Figure 5C:
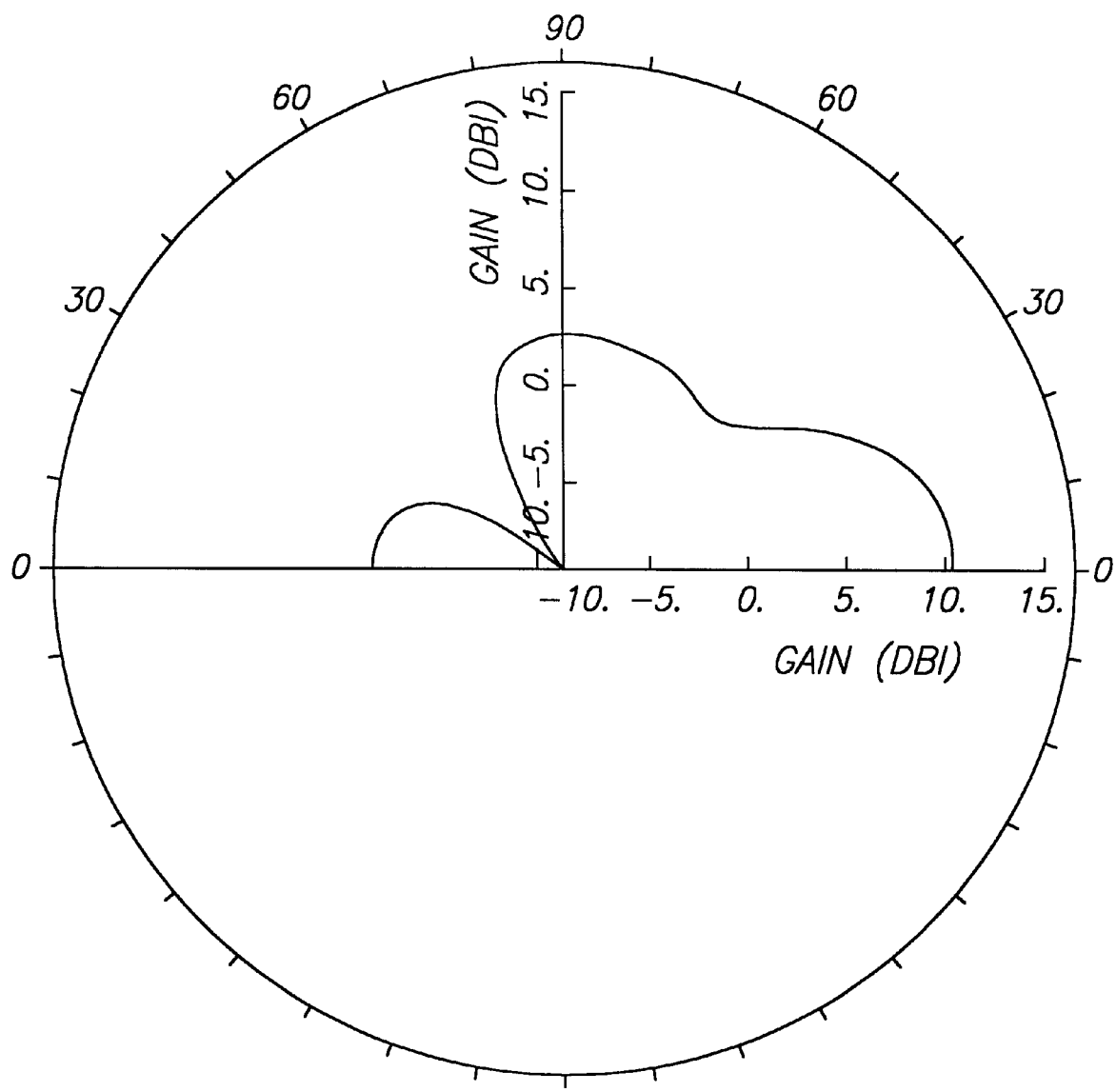
FIG. 5c shows the elevation pattern at 1000 MHz.
Figure 5D:
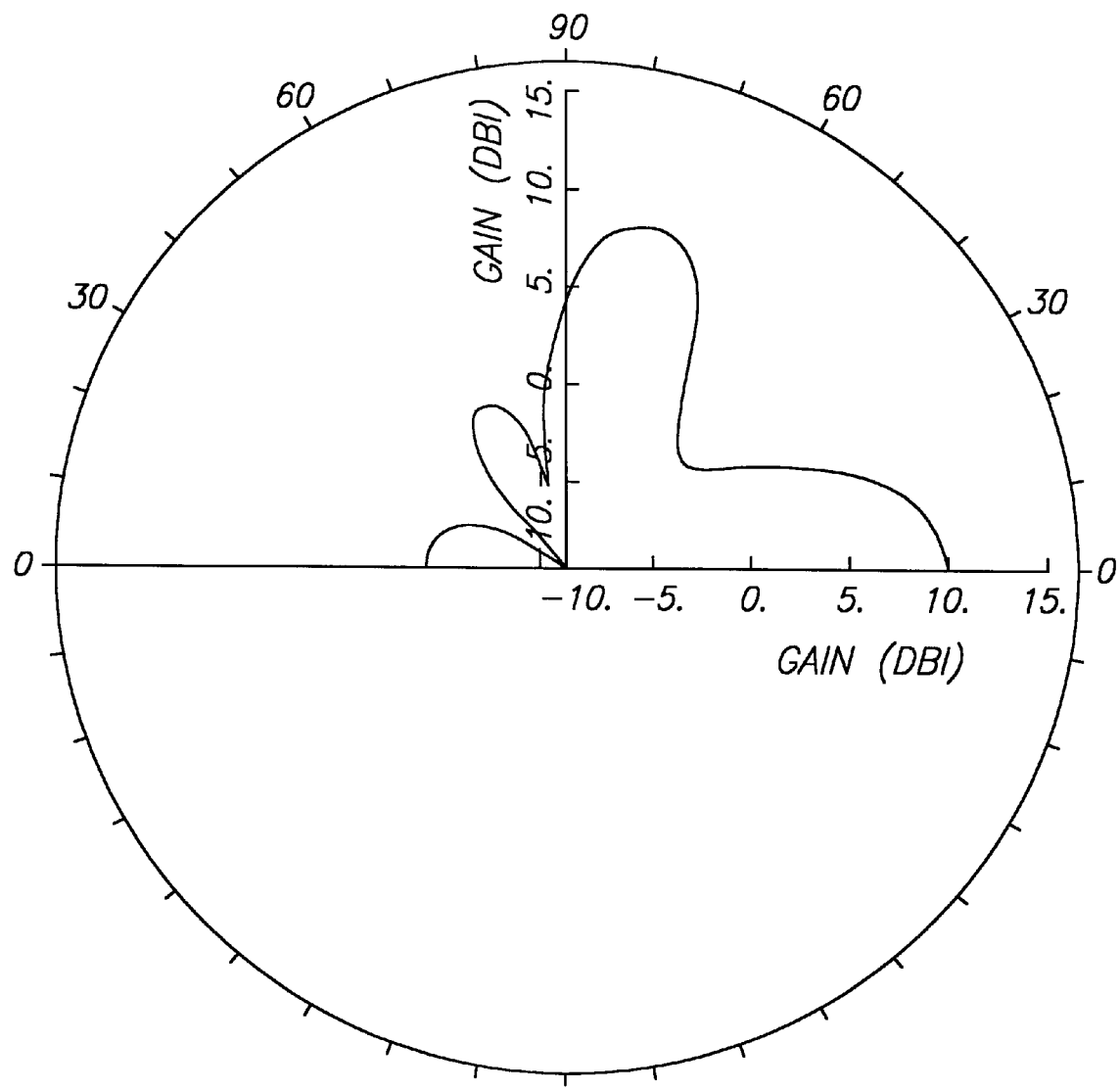
FIG. 5d shows the elevation pattern at 1500 MHz.
Figure 5E:
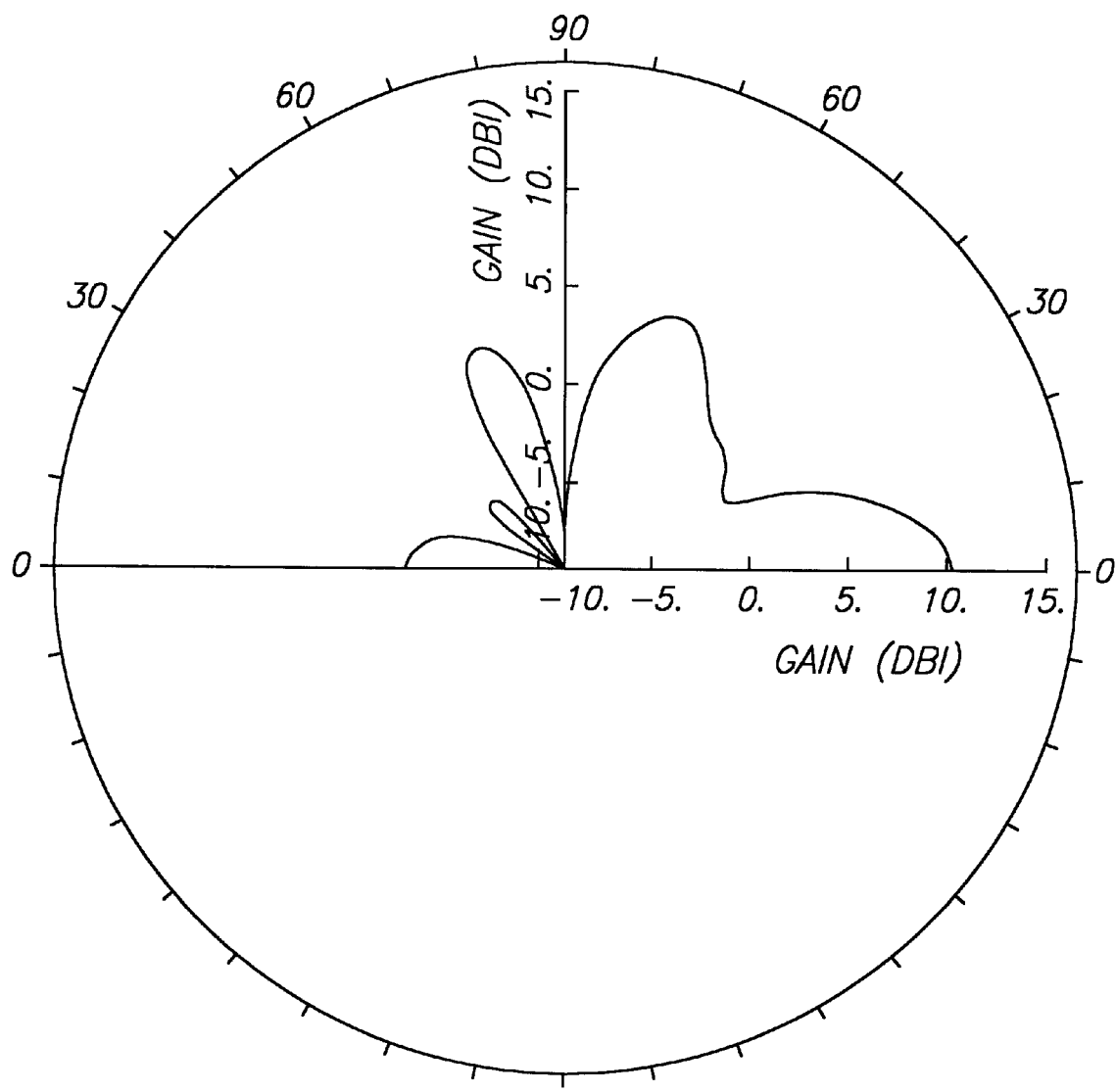
FIG. 5e shows the elevation pattern at 2000 MHz.
Figure 5F:
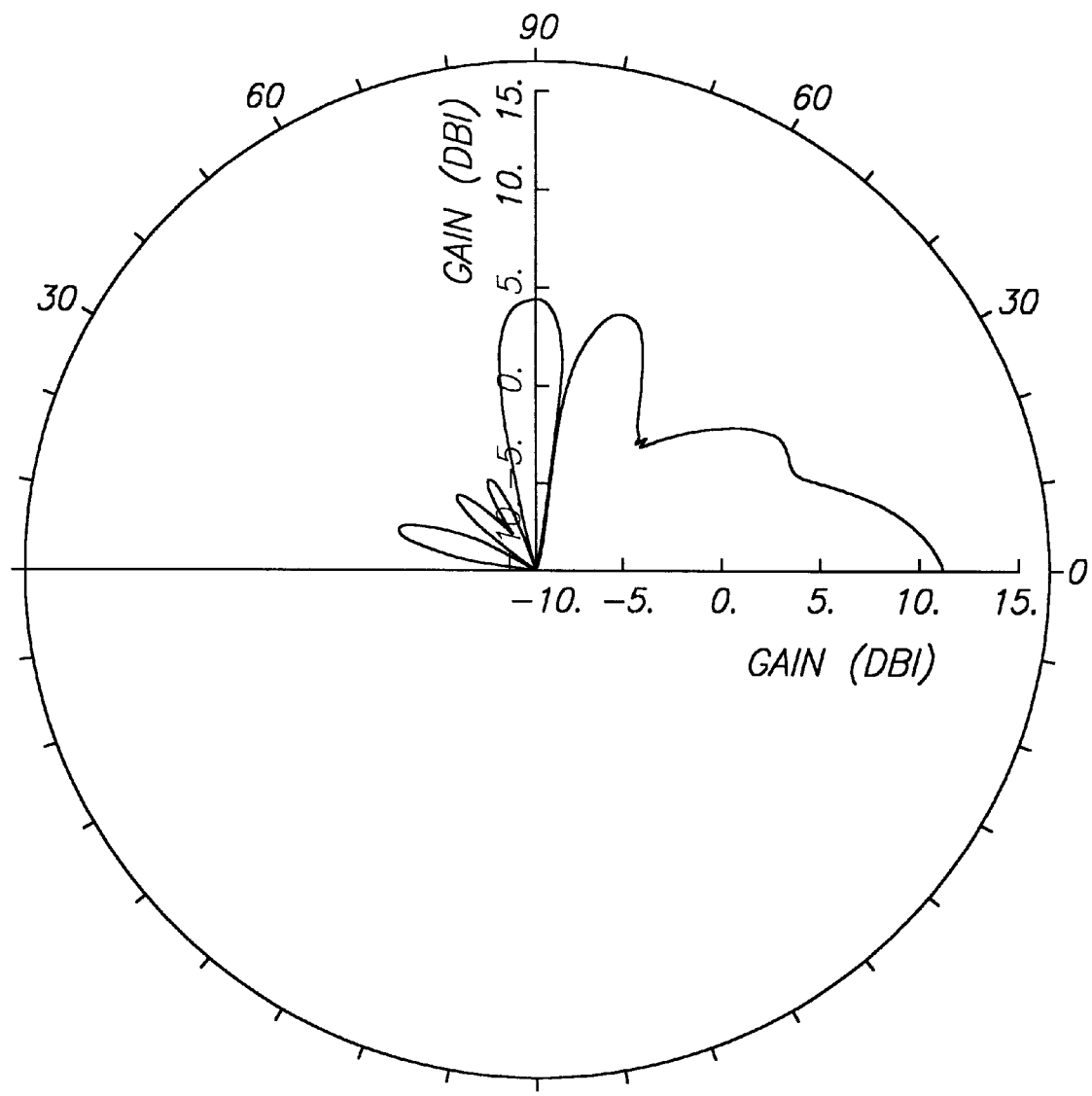
FIG. 5f shows the elevation pattern at 2700 MHz.

FIGS. 5a through 5l show calculated antenna patterns in azimuth and elevation for a single 120° fan cone made up of 13 wires over a ground plane as shown in FIG. 3c. As mentioned above, the antenna pattern of the wire antenna tracing out the fan cone shape is similar to the pattern for a fan cone made up of a curved metal sheet. FIG. 5a shows the elevation pattern at 166 MHz. At such a low frequency, the radiation pattern is the same in the forward and backward directions and is nearly isotropic. FIG. 5b shows the elevation pattern at 500 MHz; FIG. 5c shows the elevation pattern at 1000 MHz; FIG. 5d shows the elevation pattern at 1500 MHz; FIG. 5e shows the elevation pattern at 2000 MHz; and FIG. 5f shows the elevation pattern at 2700 MHz. As the frequency of the radiation increases, the amount of radiation radiated in a backward direction decreases and the gain of the forward radiation increases. At 2700 MHz, back lobe is significantly reduced and the gain at low angles in the forward direction is more than 10 dBi and is over 5 dB greater than it is at 500 MHz. In different embodiments, preferably the gain varies between about 3 dBi and 15 dBi. Most preferably, the gain varies between about 5 dBi and about 10 dBi.

Figure 5G:
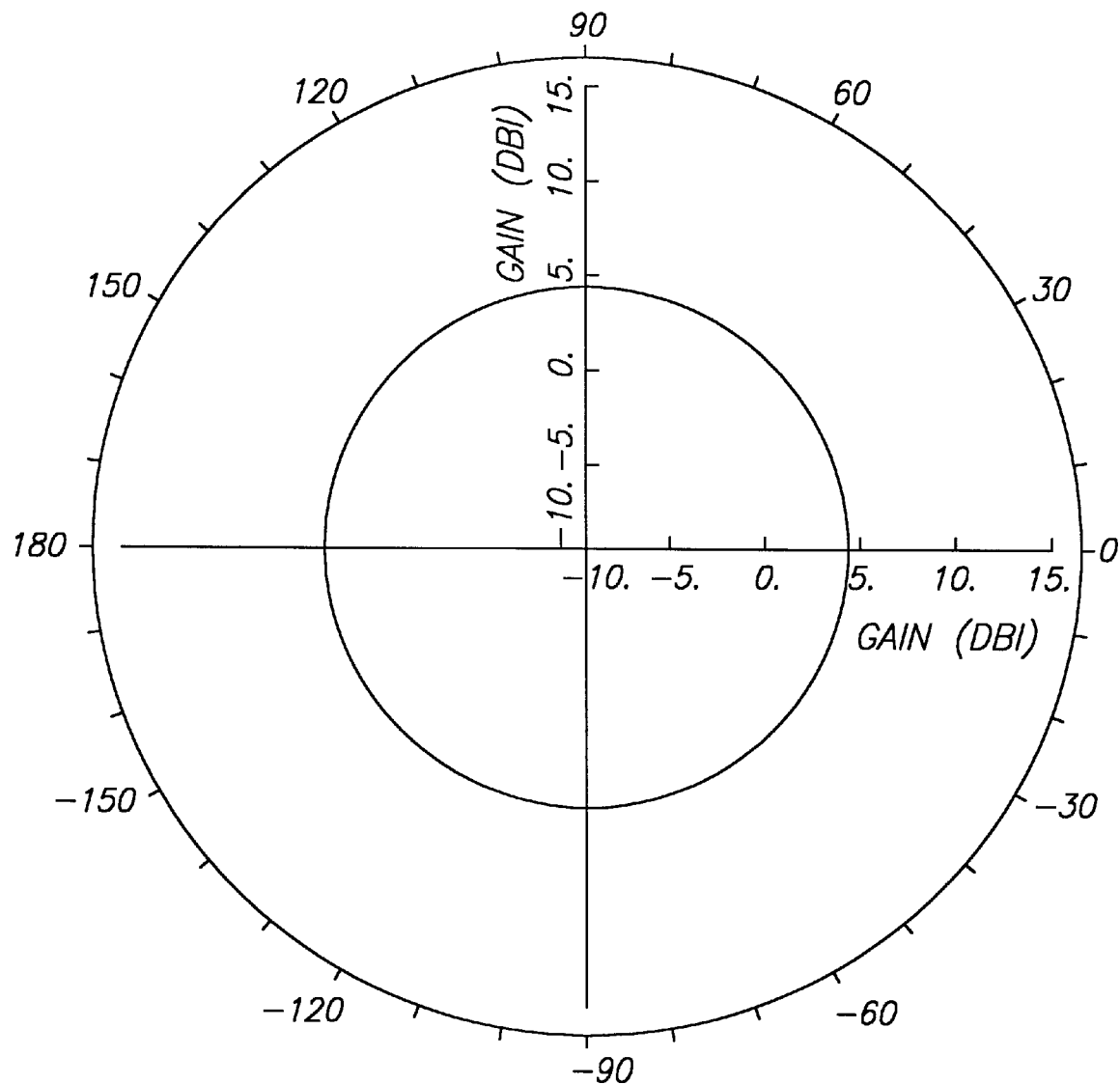
FIG. 5g shows the azimuth pattern at 166 MHz at an elevation angle of 0°.
Figure 5I:
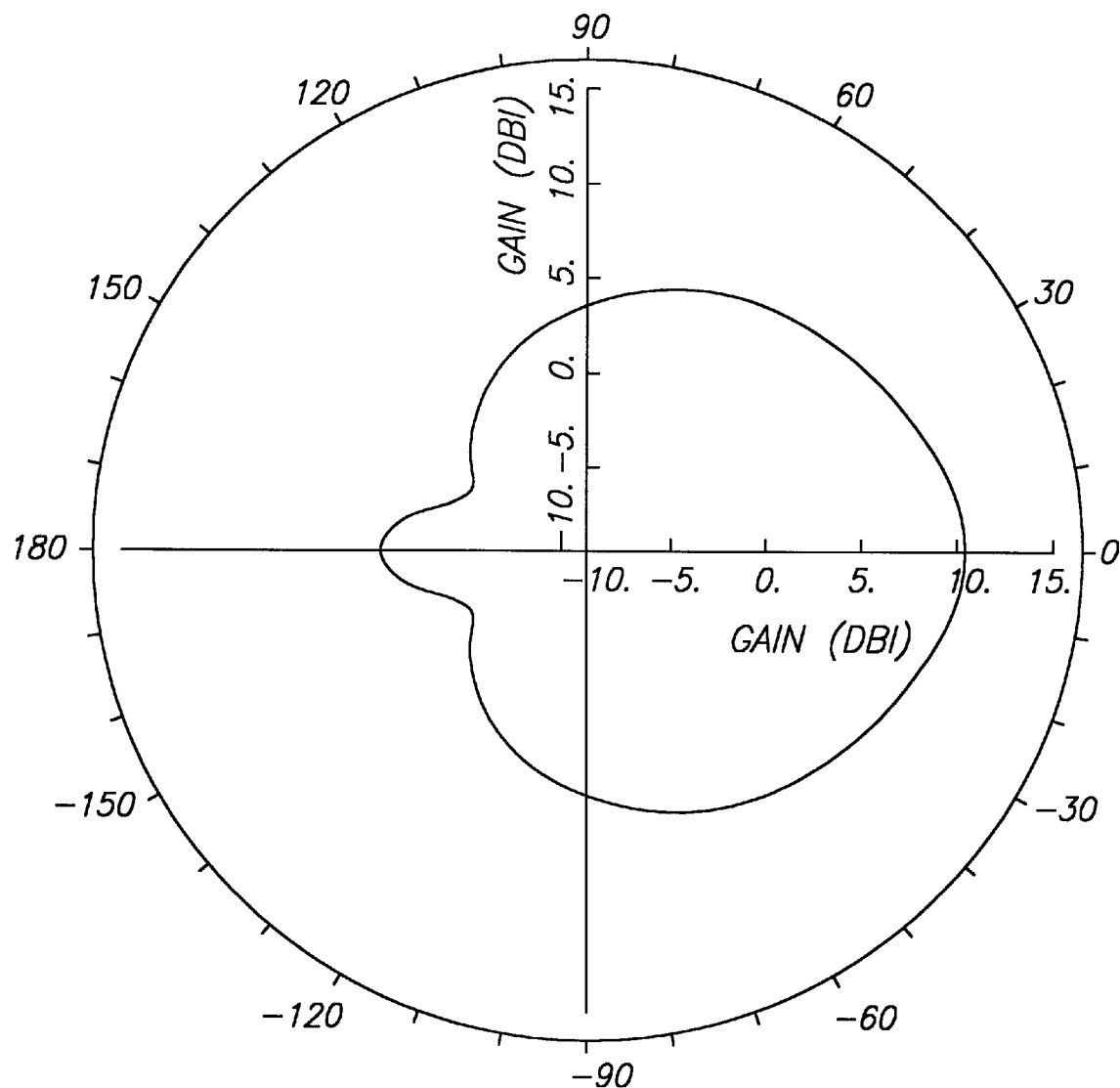
FIG. 5i shows the azimuth pattern at 1000 MHz.
Figure 5J:
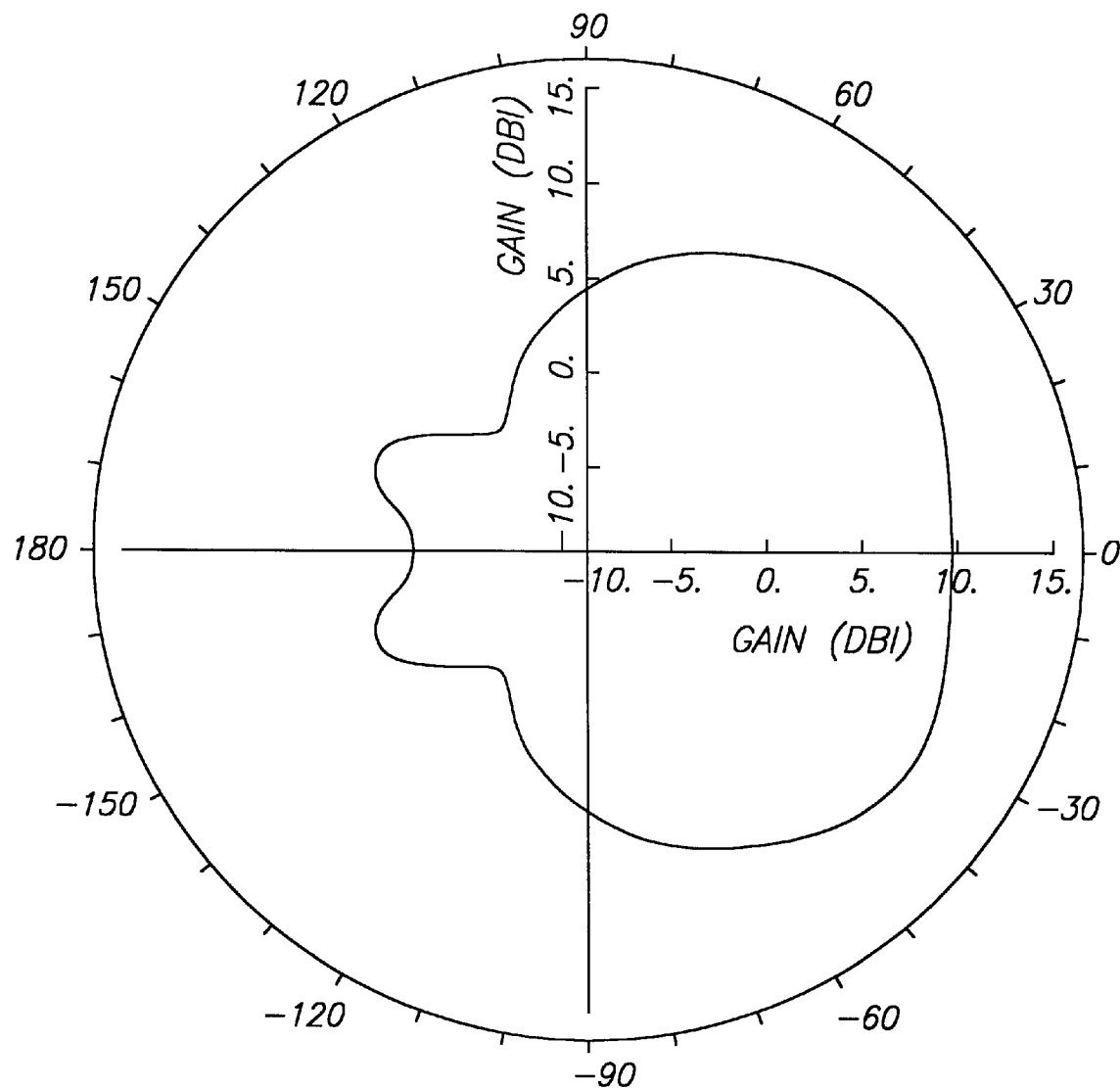
FIG. 5j shows the azimuth pattern at 1500 MHz.
Figure 5K:
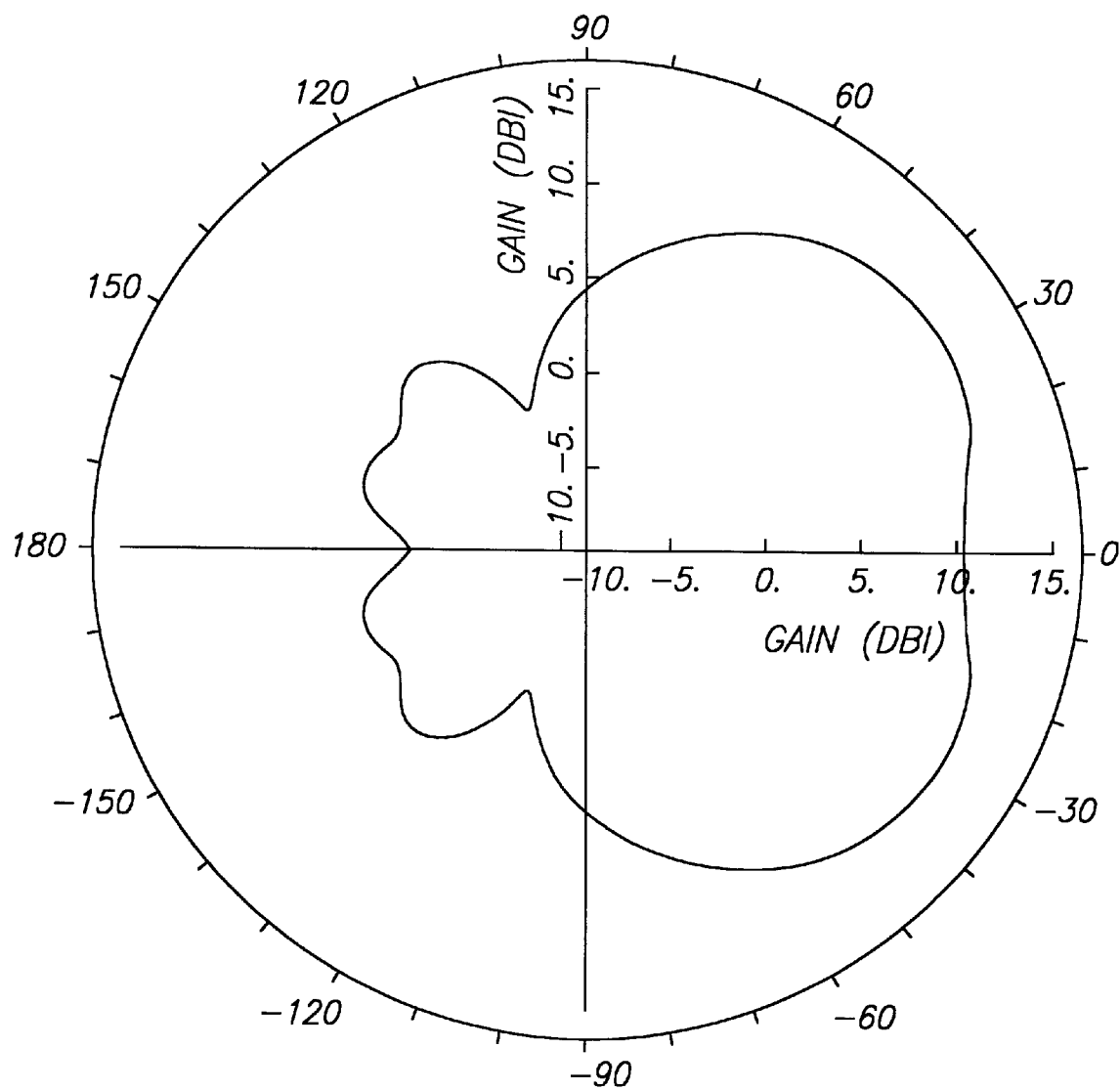
FIG. 5k shows the azimuth pattern at 2000 MHz.
Figure 5L:
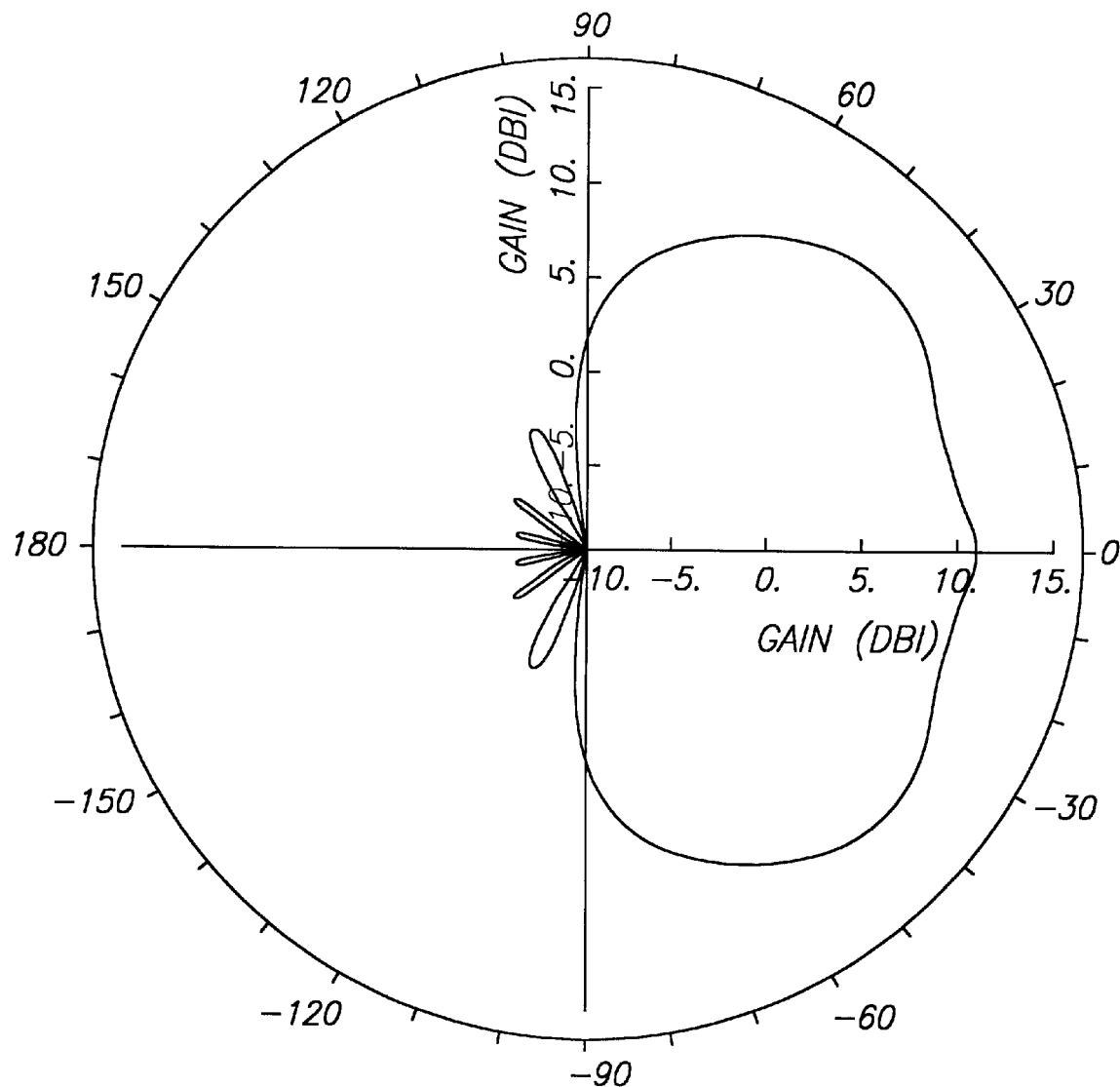
FIG. 5l shows the azimuth pattern at 2700 MHz.

FIG. 5g shows the azimuth pattern at 166 MHz at an elevation angle of 0°. At such a low frequency, the radiation pattern is the same in the forward and backward directions and is nearly isotropic. The forward azimuthal direction is defined as the direction pointing from the center of the fan cone radiator surface toward the cone axis. It should be noted that in other embodiments, the forward direction is similarly defined. For example, in the flat fan embodiment, the forward direction is defined as the direction toward which the flat fan is tilted. FIG. 5h shows the azimuth pattern at 500 MHz; FIG. 5i shows the azimuth pattern at 1000 MHz; FIG. 5j shows the azimuth pattern at 1500 MHz; FIG. 5k shows the azimuth pattern at 2000 MHz; and FIG. 5l shows the azimuth pattern at 2700 MHz. As the frequency of the radiation increases, the amount of radiation radiated in a backward direction decreases and the gain of the forward radiation increases. At 2700 MHz, the back lobe is significantly reduced and the gain at low angles in the forward direction is over 10 dBi and is more than 5 dB greater than it is at 500 MHz.

Thus, the biconical fan cone, the single fan cone antennas and the flat fan antennas are broadband antennas in the VHF/UHF/SHF bands. The antenna patterns are similar, providing a gain of greater than 5 dBi and up to over 10 dBi. The VSWR of the antenna for a 50Ω feed is most preferably approximately 2 across a large bandwidth of at least about 16:1. In other embodiments, the VSWR is less than 5 across a bandwidth of at least 15:1 or less than 8 across a bandwidth of 15:1. Above about 1000 MHz, the antenna provides about 5 dB more gain in the forward direction than a corresponding full cone antenna with a symmetric pattern. It should be noted that the minimum frequency at which the 5 dB gain increase is realized varies according to the physical size of the antenna and so the 5 dB gain can be realized at a desired frequency by scaling the antenna accordingly.

As mentioned above, the flat fan antennas and the biconical fan antennas described above are particularly suited for inclusion in an array of antennas used for direction finding. Specifically, the asymmetrical antenna patterns shown above are useful in direction finding arrays. The attenuated back lobes of the antennas help to generally reduce interference between the antennas in a circular array with the antennas located about the circumference of the circle and pointing outward from the circle. As noted above, direction finding arrays generally operate by comparing the phase of the signals received by antennas arranged in an array. Information about direction may also be derived from the amplitude of the signals received from antennas facing different directions in an array when the antennas have asymmetric patterns as shown above. The information obtained may be used to make a rough approximation of direction which is used to resolve ambiguities in the phase information or to detect and correct errors in the phased derived direction. In one embodiment, a check is made that the phase derived direction and an amplitude derived direction are within 90° or else the phase derived direction is flipped 180° so that the phase derived direction and the amplitude derived direction are within 90°.

Figure 6:
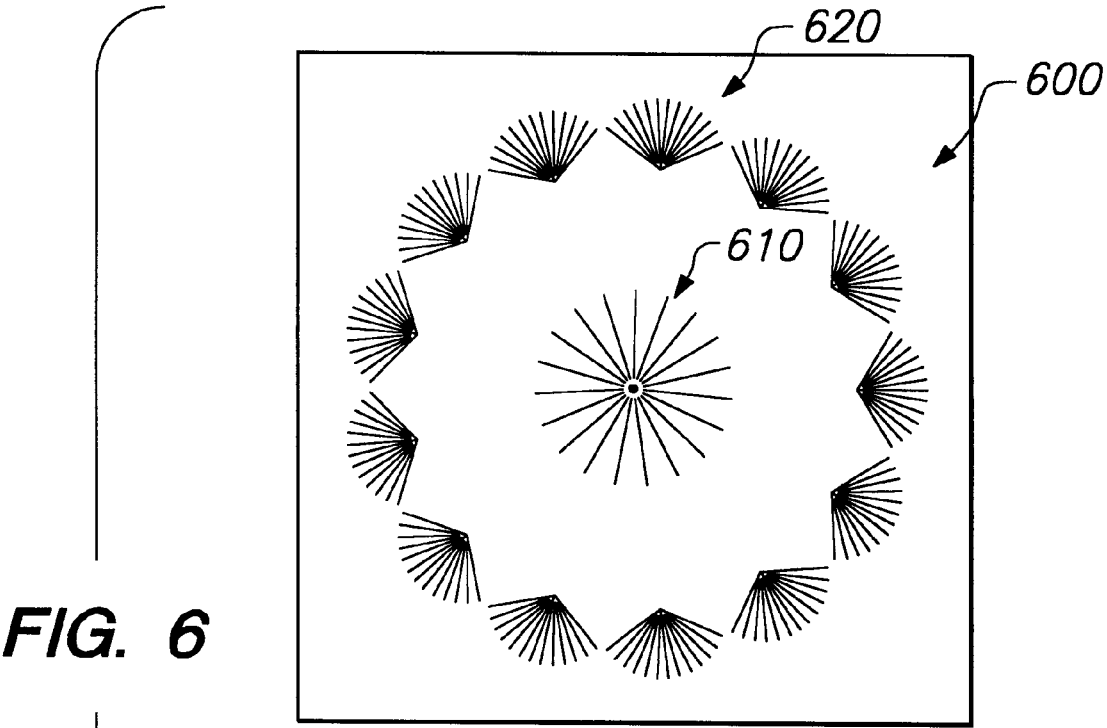
FIG. 6 is a schematic diagram of a direction finding antenna array that includes a fixed reference biconical antenna at the center and 13 120° conical fan antennas that are equally spaced along the circumference of a circle around the center antenna.
Figure 6:
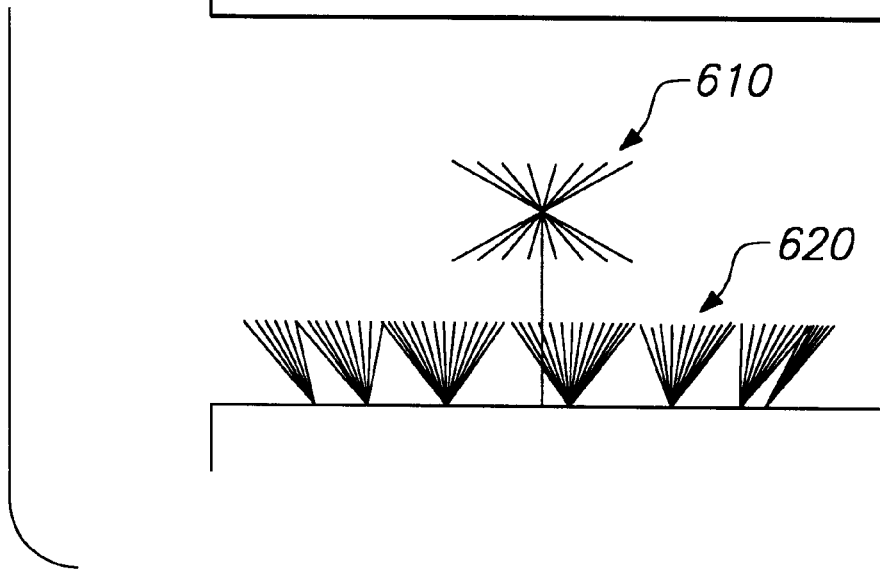

FIG. 6 is a schematic diagram of a direction finding antenna array 600 that includes a fixed reference biconical antenna 610 at the center and 13 120° conical fan antennas 620 that are equally spaced along the circumference of a circle around the center antenna. The fans are pointed outward, away from the center of the circle. This particular array is compact and particularly suitable for a mobile application where the array is mounted on the top of a van, for example. In other embodiments, different numbers of conical fan antennas are used, including 4 through 24. More elements may be used if required. It is preferred that odd numbers of antennas are used since fewer ambiguities result when the array is used for direction finding. Note that the fan shape of the 13 conical fan antennas enables them to be spaced together more closely without physically interfering with each other than would be possible if the antennas were full 360° cones.

The use of the fan shaped antennas reduces electrical interference among the elements because the back lobes of the radiation are reduced for the fans as shown above. The fixed reference antenna is a biconical antenna that includes two full cones and is elevated above a ground plane. The 13 conical fan antennas are single cone portions mounted over a ground plane. Each of the antennas include a series of wires which trace out the cone or partial cone shape. In an embodiment utilizing a mobile antenna array, the antennas operate at frequencies between 20 and 2700 MHz.

In another embodiment, a 9 element array of 80 degree flat fan antennas provides a particularly compact array that is useful for mobile applications. In such mobile embodiments, it is preferred to cover the array with a radome for protection.

The use of a central reference antenna is a particularly useful feature of certain embodiments of the present invention. In order to reliably measure the amplitude and phase of the signal received by each antenna in the array for the purpose of direction finding, the signal received by each antenna is compared to a reference signal. It is important that the reference signal be a sufficiently strong signal. In circular antenna arrays that do not have a central reference antenna, one of the other antennas on the circle that has a strong signal is used as a reference for the signal measured at a measured antenna. A disadvantage of this approach is that an n by 1 switch is required to select the antenna to be used as a reference. At high frequencies such switches can be expensive.

In certain embodiments, a central reference antenna that is a full cone and is omniazimuthal is directly wired to a reference receiver and used as a reference for all of the elements of a circular array so that no switch is required to select the reference antenna for input to the reference receiver. Thus, a full 360° omniazimuthal conical antenna is used as a central reference and fan cones which provide a directional pattern with gain in the forward direction are used as outwardly directed elements on the circle. The central reference antenna has similar radial length and cone angle to the fan cones used as the elements on the circle.

Figure 7:
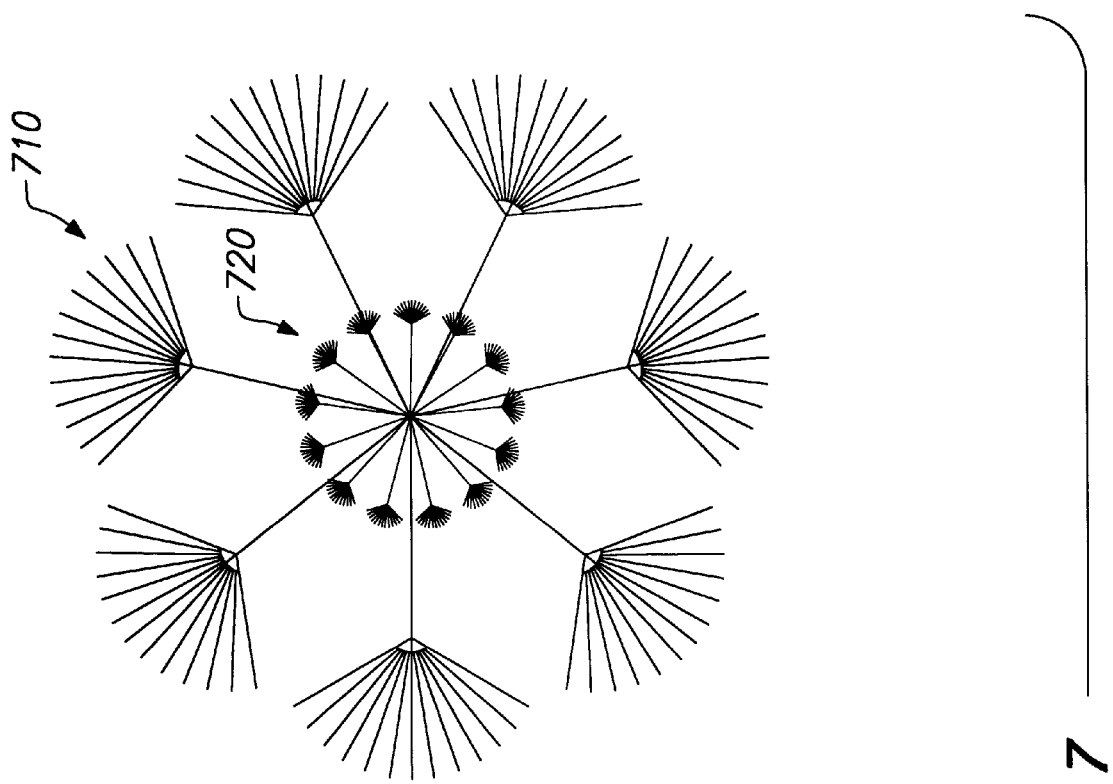
FIG. 7 is a schematic diagram of a combined high and low frequency direction finding array that includes a 7 element low frequency array that is used for frequencies between about 20 MHz and 175 MHz and a 13 element high frequency array that is used for frequencies between about 175 MHz and 2700 MHz.
Figure 7:
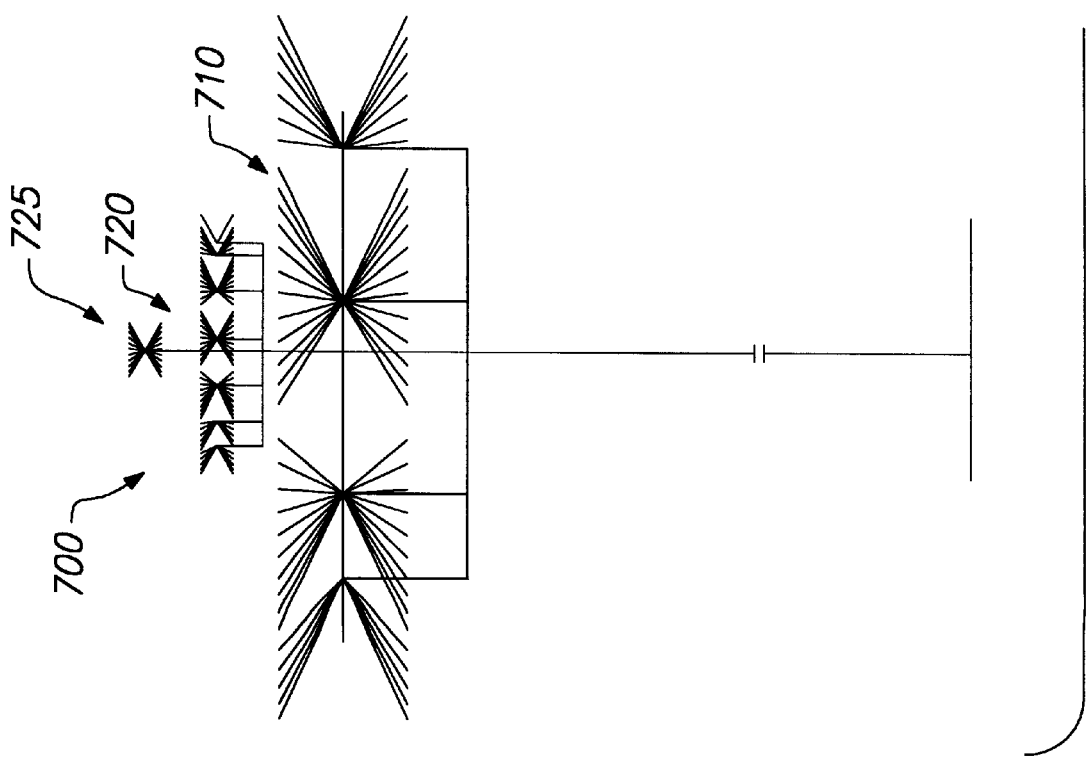

FIG. 7 is a schematic diagram of a combined high and low frequency direction finding array 700 that includes a 7 element low frequency array that is used for frequencies between about 20 MHz and 175 MHz and a 13 element high frequency array that is used for frequencies between about 175 MHz and 2700 MHz. The 13 element high frequency element array uses a central reference antenna 725 that is elevated above the 13 element high frequency array. Central reference antenna 725 is a full 360° sweep biconical antenna. The 7 element low frequency array does not use a central reference antenna. This is because the other antennas in the array may be used as references. This is practical because low frequency n×1 switches are relatively inexpensive. High frequency switches, on the other hand, are more expensive and so it is more cost effective to use a central reference antenna.

Both the 7 element low frequency array and the 13 element high frequency array use biconical partial cone antennas constructed of wires that trace out the partial cone shape. Alternatively, curved metal sheets could be used to define the partial cone shape or flat fan antennas could be used. The use of 120° cones allows the array to be compact. Other partial cone angles are used in other embodiments. Biconical antennas are used since the entire array is shown elevated above the ground. In other embodiments, one or both of the arrays are mounted on a ground plane and single cones are used. In certain other embodiments, metal sheets instead of wires are used to trace the cone path. The combined high and low frequency direction finding array provides service over an extremely wide bandwidth.

Thus, a wide band fan antenna with gain in a forward direction has been disclosed for use in a direction finding array. The direction finding array includes a number of such antennas arranged around the circumference of a circle and, in some embodiments, a central omniazimuthal pattern antenna is included as a reference antenna.

Although the foregoing invention has been described in some detail for purposes of clarity of understanding, it will be apparent that certain changes and modifications may be practiced within the scope of the appended claims. It should be noted that there are may alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A partial fan cone antenna comprising:
a radiator having a partial cone shape, the radiator substantially occupying a spatial area defined by a portion of a cone, the cone being defined by a cone axis, a cone height, and a cone angle, the cone having a base and an apex, wherein the portion of the cone is defined by a cone sweep angle, the cone sweep angle being determined as the angle subtended by a projection of the portion of the cone projected onto a plane that is perpendicular to the cone axis and the cone sweep angle being less than 360° so that the portion of the cone is bounded on its sides by edges which extend radially from the apex of the cone outward to the base of the cone, wherein the radiator radiates a substantially directional beam pattern.

2. A partial fan cone antenna as recited in claim 1 wherein the spatial area extends substantially to the apex of the cone.

3. A partial fan cone antenna as recited in claim 1 wherein the spatial area has an inner edge and the inner edge of the spacial area in the vicinity of the apex is less than about 0.5 inch wide.

4. A partial fan cone antenna as recited in claim 1 wherein the spatial area has an inner edge and the inner edge of the spacial area in the vicinity of the apex is less than about 0.25 inch wide.

5. A partial fan cone antenna as recited in claim 1 wherein the cone is truncated in the vicinity of its apex so that a portion of the cone near the apex is not included in the spatial area.

6. A partial fan cone antenna as recited in claim 1 wherein the partial cone shaped radiator comprises a plurality of wires wherein the wires extend radially outward from the vicinity of the apex of the cone to the base of the cone.

7. A partial fan cone antenna as recited in claim 6 wherein the plurality of wires consists of 13 wires.

8. A partial fan cone antenna as recited in claim 6 wherein the plurality of wires consists of 9 wires.

9. A partial fan cone antenna as recited in claim 1 wherein the partial cone shaped radiator comprises a metal sheet.

10. A partial fan cone antenna as recited in claim 1 wherein the cone sweep angle is between 80° and 180°.

11. A partial fan cone antenna as recited in claim 1 wherein the cone sweep angle is between 105° and 135°.

12. A partial fan cone antenna as recited in claim 1 wherein the cone sweep angle is about 120°.

13. A partial fan cone antenna as recited in claim 1 wherein the cone axis is substantially vertical.

14. A partial fan cone antenna as recited in claim 1 wherein the cone axis is tilted from vertical.

15. A partial fan cone antenna as recited in claim 1 further including a horizontal ground plane located in the vicinity of the apex.

16. A partial fan cone antenna as recited in claim 1 further including a circular horizontal plate located in the vicinity of the apex.

17. A partial fan cone antenna as recited in claim 1 further including a second partial cone shaped radiator, the second partial cone shaped radiator being substantially a reflection of the first partial cone radiator, the plane of reflection being a horizontal plane that is located in the vicinity of the apex of the first partial cone radiator.

18. A partial fan cone antenna as recited in claim 17 further including a dielectric spacer between the first and second partial cone shaped radiators.

19. A partial fan cone antenna as recited in claim 1 wherein the VSWR of the antenna for a 50Ω signal is less than about 4 over a frequency range between 200 MHz and 3000 MHz.

20. A partial fan cone antenna as recited in claim 1 wherein the VSWR of the antenna for a 50Ω signal is less than about 5 over a frequency range between 200 MHz and 3000 MHz.

21. A partial fan cone antenna as recited in claim 1 wherein the gain of the antenna in the forward direction is greater than about 5 dBi at frequencies between about 500 MHz and about 2700 MHz.

22. A partial fan cone antenna as recited in claim 1 wherein the gain of the antenna in the forward direction is greater than about 5 dBi at frequencies between about 500 MHz and about 1000 MHz.

23. A partial fan cone antenna as recited in claim 1 wherein the gain of the antenna in the forward direction is greater than about 10 dBi at frequencies between about 1000 MHz and about 2700 MHz.

24. A partial fan cone antenna as recited in claim 1 further including a plurality of partial fan cone antennas arranged in a direction finding array.

25. A partial fan cone antenna as recited in claim 24 wherein the plurality of partial fan cone antennas are arranged about the circumference of a circle and wherein each partial fan cone antenna is pointed outward from the center of the circle whereby the plurality of partial fan cone antennas may be spaced more closely together than would be possible if the fan cone antennas were full cones.

26. A partial fan cone antenna as recited in claim 25 wherein the antenna radiation patterns of the outwardly directed partial fan cone antennas are asymmetric so that a determination of direction may be made by comparing the amplitude of a signal at each antenna.

27. A partial fan cone antenna as recited in claim 24 further including a central reference full cone antenna, the central reference full cone antenna having a substantially omniazimuthal antenna pattern so that the central reference full cone antenna is suitable for use as a reference antenna for determining the phase of the signal received by the plurality of partial fan cone antennas arranged about the circumference of the circle.

28. A partial fan cone antenna as recited in claim 25 wherein the plurality of partial fan cone antennas arranged about the circumference of the circle consists of 13 antennas.

29. A partial fan cone antenna as recited in claim 25 wherein the plurality of partial fan cone antennas arranged about the circumference of the circle consists of 9 antennas.

* * * * *